(12) United States Patent
Lee et al.

(10) Patent No.: US 11,465,291 B2
(45) Date of Patent: Oct. 11, 2022

(54) ROBOT

(71) Applicant: LG ELECTRONICS INC., Seoul (KR)

(72) Inventors: Sanghak Lee, Seoul (KR); Nakyeong Kim, Seoul (KR); Sungmin Moon, Seoul (KR); Jun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 581 days.

(21) Appl. No.: 16/582,496

(22) Filed: Sep. 25, 2019

(65) Prior Publication Data

US 2020/0016763 A1    Jan. 16, 2020

(30) Foreign Application Priority Data

Aug. 28, 2019    (KR) .......................... 10-2019-0106049

(51) Int. Cl.
*G06F 17/00*    (2019.01)
*B25J 11/00*    (2006.01)
*B25J 18/00*    (2006.01)
*B25J 9/00*    (2006.01)

(52) U.S. Cl.
CPC .......... *B25J 11/0045* (2013.01); *B25J 9/0003* (2013.01); *B25J 18/00* (2013.01)

(58) Field of Classification Search
CPC ...... B25J 11/0045; B25J 9/0003; B25J 18/00; B25J 9/0018; B25J 19/0029; B25J 9/0087; B25J 9/0009; B25J 9/101; B25J 9/104; B25J 9/126; A23P 30/10

USPC ........................................................... 700/245
See application file for complete search history.

(56) References Cited

U.S. PATENT DOCUMENTS

| | | | | |
|---|---|---|---|---|
| 10,518,409 | B2 * | 12/2019 | Oleynik | B25J 15/0095 |
| 10,905,862 | B2 * | 2/2021 | Kelly | A61M 39/24 |
| 2009/0099691 | A1 * | 4/2009 | Tojo | B25J 9/0003 901/41 |
| 2016/0059412 | A1 * | 3/2016 | Oleynik | B62D 57/032 700/250 |
| 2016/0067866 | A1 * | 3/2016 | Sekar | A47J 44/00 99/348 |
| 2016/0288239 | A1 * | 10/2016 | Beary | B23K 9/04 |
| 2019/0310611 | A1 * | 10/2019 | Jain | B65D 83/06 |
| 2020/0009737 | A1 * | 1/2020 | Kim | B25J 11/0005 |
| 2020/0015508 | A1 * | 1/2020 | Lee | A23P 30/10 |
| 2020/0016760 | A1 * | 1/2020 | Lee | B25J 9/1697 |
| 2020/0016762 | A1 * | 1/2020 | Kim | B25J 9/0018 |
| 2020/0037824 | A1 * | 2/2020 | Moon | A47J 44/00 |
| 2020/0375388 | A1 * | 12/2020 | MacFarlane | G06Q 20/3224 |
| 2022/0031123 | A1 * | 2/2022 | He | B25J 11/0045 |

FOREIGN PATENT DOCUMENTS

JP    4531832-82    8/2010

* cited by examiner

*Primary Examiner* — Ronnie M Mancho
(74) *Attorney, Agent, or Firm* — Birch, Stewart, Kolasch & Birch, LLP

(57) ABSTRACT

A robot includes a robot arm formed with an ingredient channel including an ingredient inlet and an ingredient outlet; an ingredient feeder having an ingredient port configured to discharge ingredients; and a carrier configured to move the robot arm to a connection position where the ingredient inlet is connected to the ingredient port, and move the robot arm to an area where the ingredient inlet is separated from the ingredient port.

20 Claims, 12 Drawing Sheets

ROBOT

CROSS-REFERENCE TO RELATED APPLICATIONS

This application claims the benefit of priority to Korean Patent Application No. 10-2019-0106049, filed in the Korean Intellectual Property Office on Aug. 28, 2019, the entire contents of which are incorporated herein by reference.

FIELD OF THE DISCLOSURE

The present disclosure relates to a robot system and a control method of the same.

Robots are machines that automatically process given tasks or operate with their own capabilities. The application fields of robots are generally classified into industrial robots, medical robots, aerospace robots, and underwater robots. Recently, communication robots that can communicate with humans by voices or gestures have been increasing.

Recently, a cooking robot capable of cooking by using a robot is gradually increased and an example of such a robot is a cooking assistant robot disclosed in Japanese Patent Publication No. 4531832 (published on Aug. 25, 2010).

The cooking assistant robot disclosed in Japanese Patent Publication No. 4531832 is a robot that assists cooking using a cooking container disposed on a cooking burner, and includes a hand part, an arm part for changing the position and posture of the hand part, and a support part for supporting the arm part as well as at least six movable parts capable of arbitrarily changing the position and posture of the hand part.

SUMMARY

Embodiments provide a robot capable of maximizing a cooking area in which a robot arm can perform a cooking operation and safely and reliably supplying an ingredient to an ingredient container located far from an ingredient feeder.

In one embodiment, a robot includes a robot arm formed with an ingredient channel including an ingredient inlet and an ingredient outlet; an ingredient feeder having an ingredient port configured to discharge ingredients; and a carrier configured to move the robot arm to a connection position where the ingredient inlet is connected to the ingredient port, and move the robot arm to an area where the ingredient inlet is separated from the ingredient port.

A first connector may be provided on one of the robot arm or the ingredient feeder, and a second connector may be provided on the other of the robot arm or the ingredient feeder such that the first connector is connected to or disconnected from the second connector.

One of the first connector or the second connector may include an insertion portion inserted into the other of the first connector or the second connector.

A connector channel through which ingredients pass may be formed in at least one of the first connector or the second connector. The ingredient port and ingredient inlet may face the connector channel. The ingredients sequentially may pass through the ingredient port, the connector channel and the ingredient inlet.

The ingredient channel is formed by a tube. The ingredient port may be formed by a feed tube formed therein with a passage through which ingredients pass. The first connector may surround a portion of the tube, and the second connector may surround a portion of the feed tube.

The ingredient inlet and the ingredient port may have same heights.

The ingredient inlet and the ingredient port may be spaced apart from each other in a horizontal direction. The carrier may move the robot arm in the horizontal direction.

A height of an upper end of the robot arm may be higher than a height of a lower end of the ingredient feeder.

One example of the carrier may include a connector to which the robot arm is connected; a motor; and at least one power transmission member configured to transmit driving force of the motor to the connector to linearly move the connector.

The power transmission member may include a pair of pulleys; and a belt wound around the pair of pulleys. The motor may rotate at least one of the pair of pulleys. The connector may be connected to the belt.

Another example of the carrier may include a connector to which the robot arm is connected; and a screw motor configured to linearly move the connector.

The robot arm may include a plurality of arms; an arm connector connecting a pair of arms adjacent to each other; an end effect connected to one of the plurality of arms; and a connector connector connected to the connector.

The ingredient channel may be formed by a tube passing through the connector connector, the arm, the end effector.

The robot may include a controller. The controller may be configured operate the carrier in a connection mode such that the ingredient inlet is connected to the ingredient port. The controller may operate the ingredient feeder in an ingredient discharge mode after the connection mode such that the ingredient feeder discharges ingredients to the ingredient port. The controller may operate the carrier in a separation mode after the ingredient discharge mode such that the robot arm is moved to a position where the ingredient inlet is separated from the ingredient port.

The robot arm may further include a variable stopper configured to open or close the ingredient channel. The variable stopper may be closer to the ingredient outlet than to the ingredient inlet.

The robot may further include a case formed with a space, and the ingredient feeder and the carrier may be accommodated in the space The case may be provided with a guide rail which is configured to guide the robot arm such that the robot arm moves back and forth with respect to the ingredient feeder.

The case may have a robot arm through hole which is elongated in a movement direction of the robot arm such that the robot arm passes through the robot arm through hole.

The robot arm may include a concealment portion accommodated in the space and including the ingredient inlet, in which concealment portion is connected to or separated from the ingredient feeder; and an exposure portion located outside the case and including the ingredient outlet.

The robot arm may further include a blower configured to supply high pressure air to the ingredient channel.

The controller may operate the blower in a blowing mode after controlling the robot arm such that the ingredient outlet of the robot arm faces an ingredient container.

DETAILED DESCRIPTION OF THE EMBODIMENTS

Hereinafter, preferred embodiments of the present invention will be described in detail with reference to the drawings.

Figure 1:
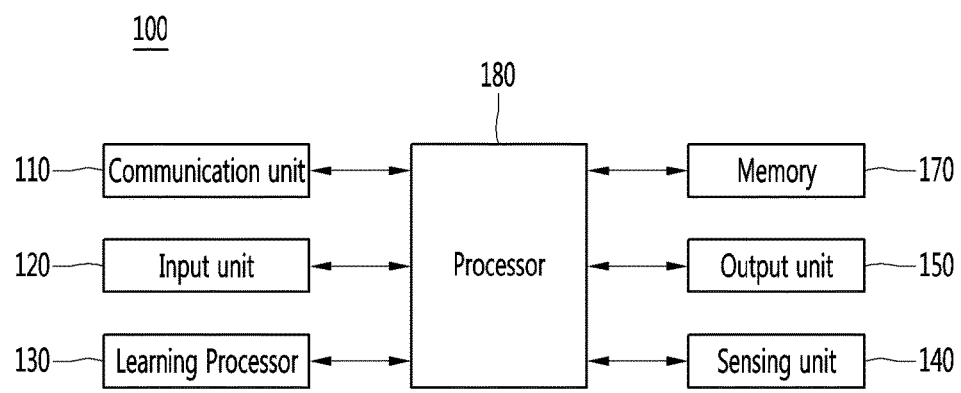
FIG. 1 is a view illustrating an AI device constituting a robot system according to an embodiment.
Figure 2:
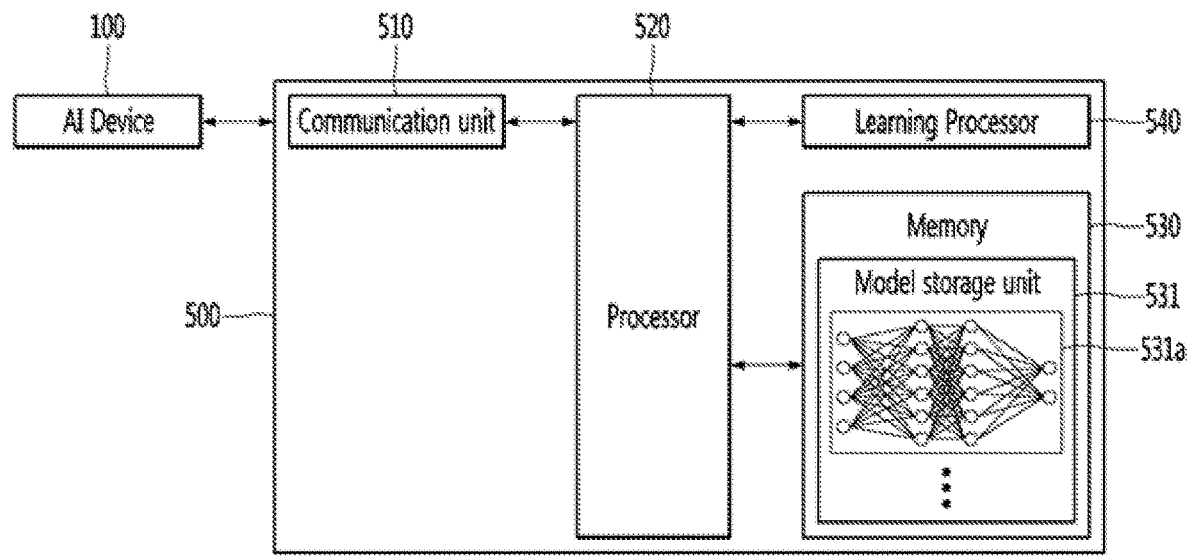
FIG. 2 is a view illustrating an AI server of a robot system according to an embodiment.
Figure 3:
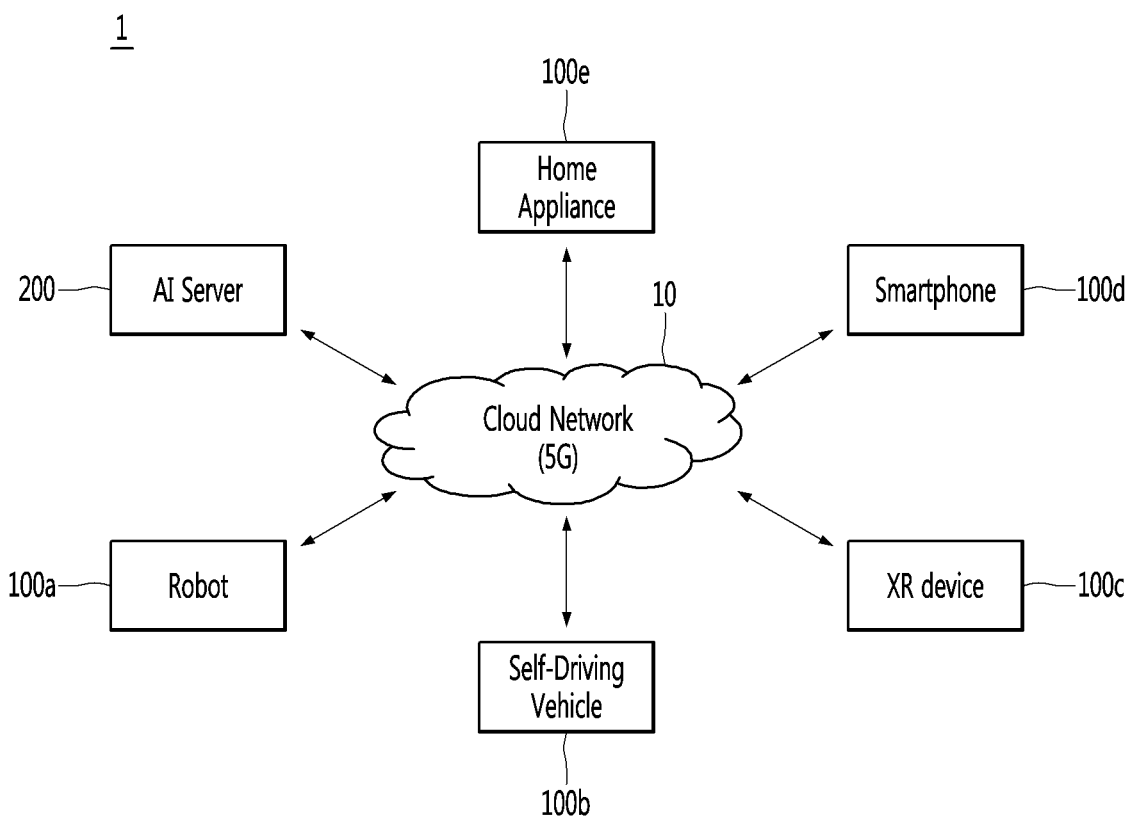
FIG. 3 is a view illustrating an AI system to which a robot system according to an embodiment is applied.

FIG. 1 is a view illustrating an AI device constituting a robot system according to an embodiment, FIG. 2 is a view illustrating an AI server of a robot system according to an embodiment and FIG. 3 is a view illustrating an AI system to which a robot system according to an embodiment is applied.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 500 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 540 of the AI server 500.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 540 of the AI server 500, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 500. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

FIG. 2 illustrates an AI server 500 connected to a robot according to an embodiment of the present invention.

Referring to FIG. 2, the AI server 500 may refer to a device that learns an artificial neural network by using a machine learning algorithm or uses a learned artificial neural network. The AI server 500 may include a plurality of servers to perform distributed processing, or may be defined as a 5G network. At this time, the AI server 500 may be included as a partial configuration of the AI device 100, and may perform at least part of the AI processing together.

The AI server 500 may include a communication unit 510, a memory 530, a learning processor 540, a processor 520, and the like.

The communication unit 510 can transmit and receive data to and from an external device such as the AI device 100.

The memory 530 may include a model storage unit 531. The model storage unit 531 may store a learning or learned model (or an artificial neural network 531a) through the learning processor 540.

The learning processor 540 may learn the artificial neural network 531a by using the learning data. The learning model may be used in a state of being mounted on the AI server 500 of the artificial neural network, or may be used in a state of being mounted on an external device such as the AI device 100.

The learning model may be implemented in hardware, software, or a combination of hardware and software. If all or part of the learning models is implemented in software, one or more instructions that constitute the learning model may be stored in memory 530.

The processor 520 may infer the result value for new input data by using the learning model and may generate a response or a control command based on the inferred result value.

FIG. 3 illustrates an AI system 1 according to an embodiment of the present invention.

Referring to FIG. 3, in the AI system 1, at least one of an AI server 500, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 500 configuring the AI system 1 may be connected to each other through the cloud network 10. In particular, each of the devices 100a to 100e and 500 may communicate with each other through a base station, but may directly communicate with each other without using a base station.

The AI server 500 may include a server that performs AI processing and a server that performs operations on big data.

The AI server 500 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 500 may learn the artificial neural network according to the machine learning algorithm instead of the AI devices 100a to 100e, and may directly store the learning model or transmit the learning model to the AI devices 100a to 100e.

At this time, the AI server 500 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 500.

At this time, the robot 100a may perform the operation by generating the result by directly using the learning model, but the sensor information may be transmitted to the external device such as the AI server 500 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4:
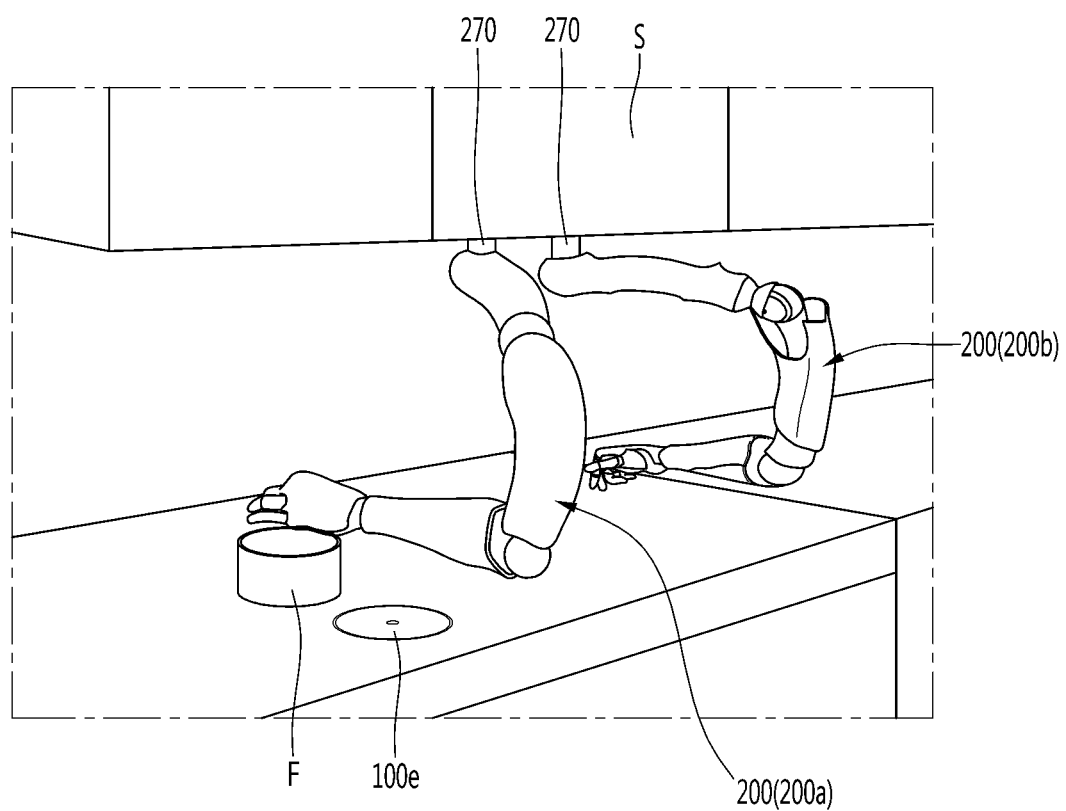
FIG. 4 is a perspective view of a robot according to an embodiment.
Figure 5:
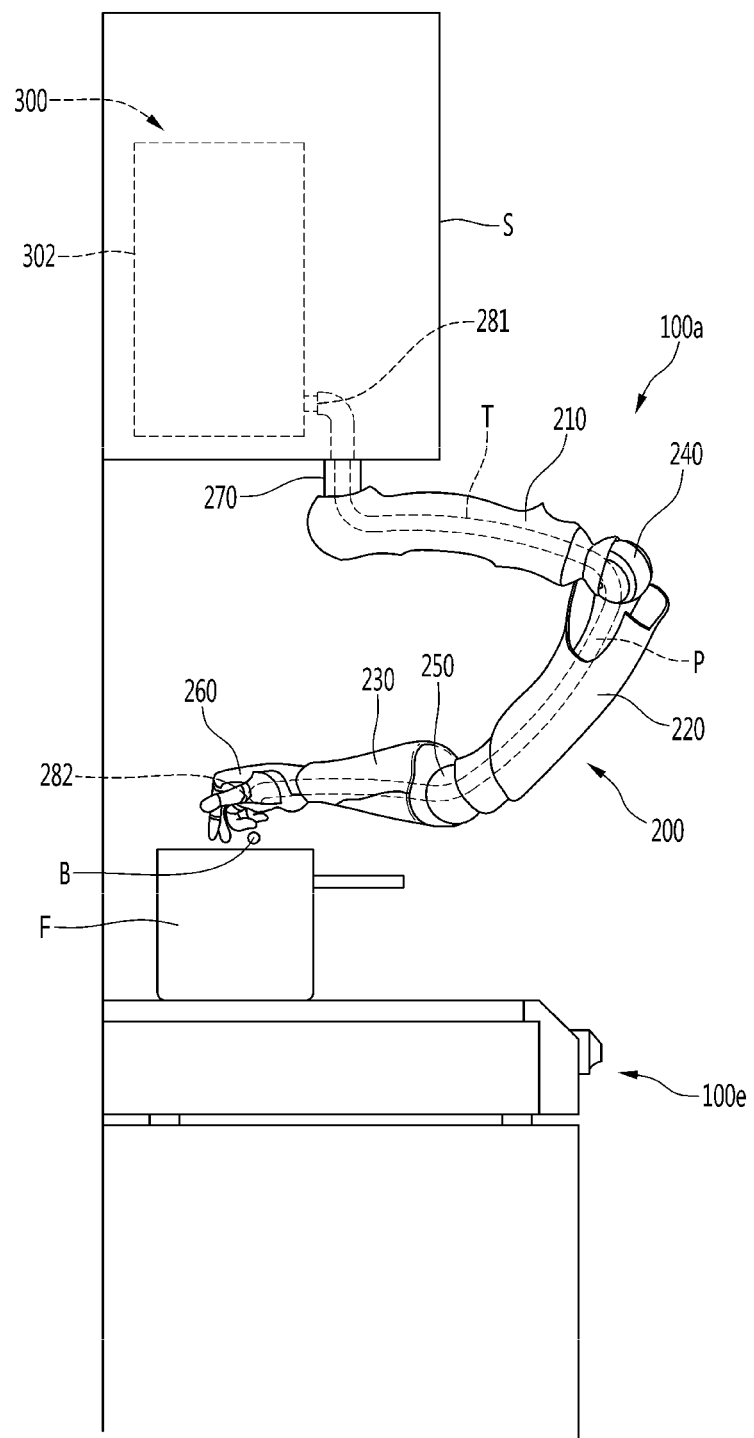
FIG. 5 is a side view illustrating an example of a robot according to an embodiment.

FIG. 4 is a perspective view of a robot according to an embodiment and FIG. 5 is a side view illustrating an example of the robot according to an embodiment.

The robot may include at least one robot arm 200 and an ingredient feeder 300 for processing food ingredients.

The robot arm 200 may perform various cooking operations including an ingredient input operation in a state of being disposed in a kitchen or the like.

The ingredient feeder 300 may process an ingredient used for cooking into a shape or size suitable for cooking.

For cooking, the robot arm 200 picks up the ingredient processed by the ingredient feeder 300 and then puts the ingredient into a tableware or a cooking container F (hereinafter referred to as cooking container F), that is, the robot arm 200 may perform the ingredient input operation.

For cooking, the ingredient feeder 300 may move the food ingredient to the robot arm 200 after processing the food ingredient, and the ingredient moved from the ingredient feeder 300 to the robot arm 200 may be introduced into the cooking container (F) by passing through the robot arm 200.

For the ingredient that passes through the robot arm 200, the robot arm 200 may be provided with an ingredient channel P through which the ingredient passes. That is, the robot arm 200 may receive the ingredient from the ingredient feeder 300, and the ingredient supplied from the ingredient feeder 300 may come out of the ingredient channel P by passing through the ingredient channel P and then fall into the container (F).

The robot arm 200 may be operated at the input timing of the ingredient such that an ingredient outlet 282 of the ingredient channel P faces the inside of the cooking container F.

When the robot arm 200 guides the ingredient supplied from the ingredient feeder 300 to the cooking container F, the ingredient may be introduced into the cooking container F more cleanly, and it is possible to minimize the falling of the ingredient around the cooking container F. That is, when the ingredient channel P through which the ingredient passes is formed in the robot arm 200, the ingredient, in particular, the ingredient processed in the ingredient feeder 300 may be accurately introduced into the cooking container P, so that the surroundings of the cooking container F may be kept to be clean.

The ingredient channel P may be a passage through which the ingredient passes, and the ingredient enters the ingredient channel P through one side of the ingredient channel P, and comes out of the ingredient channel P through the other side of the ingredient channel P.

An end effector 260 may be connected to arms 210, 220 and 230 of the robot arm 200 for various cooking operations. In addition, the ingredient channel P may be provided inside the arms 210, 220 and 230 and the end effector 260.

The robot arm 200 may perform various cooking operations related to cooking, in addition to the ingredient input operation as described above.

An example of various cooking operations performed by the robot arm 200 is that the robot arm 200 operates a cooking device 100*e* around the cooking device 100*e*, stirs the food contained in the cooking container F or transfers the finished cooking from the cooking container F to another containers such as dishes.

The robot arm 200 may include a plurality of arms 210, 220 and 230 and at least one arm connector 240 and 250 connecting the plurality of arms to perform the various cooking operations as described above. The plurality of arms 210, 220, and 230 may be sequentially disposed with the arm connectors 240 and 250 interposed therebetween.

The robot arm 200 may further include the end effector 260 installed on any one 230 of the plurality of arms 210, 220 and 230.

The end effector 260 may be a robot hand or a gripper, and the end effector 260 may be mounted at the end of the robot arm 200 to perform various functions related to the cooking so that the robot arm 200 may perform various operations related to the cooking (hereinafter referred to as cooking operation).

The robot arm 200 may include at least one motor or at least one actuator capable of rotating the arms 210, 220 and 230, the arm connectors 240 and 250, and the end effector 260.

A robot arm R constituting the robot arm 200 may be variously configured without being limited to the number or shape of the plurality of arms 210, 220 and 230, at least one arm connector 240 and 250, the motor and the actuator as long as it can three-dimensionally move and rotate the end effector 260.

The robot arm 200 may further include a robot connector 270 that connects/supports another one 210 of the plurality of arms 210, 220 and 230 to another object around the cooking device 100*e*.

Another object to which the robot connector 270 is connected/supported may be the ingredient feeder 300 that is provided in a room in which the cooking device 100*e* is installed to supply ingredients required for cooking to the robot arm 200. In this case, the ingredient feeder 300 may supply the ingredient to the robot arm 200, and the robot arm 200 may receive the ingredient from the ingredient feeder 300 to use the ingredient for cooking.

Another object to which the robot connector 270 is connected/supported may be furniture(s) such as a shelf or a storage cabinet provided in the room in which the cooking device 100*e* is installed, or may be an ingredient feeder case 302 provided in the room in which the cooking device 100*e* is installed and formed therein with the ingredient feeder 300.

The robot arm 200 may be directly connected to the ingredient feeder 300 or may be connected to the ingredient feeder 300 through a connector such as a separate ingredient supply hose. It may be defined that the robot arm 200 is connected to the ingredient feeder 300, not only when the robot arm 200 is directly connected to the ingredient feeder 300, but also when the robot arm 200 is connected to the ingredient feeder 300 through a connector such as an ingredient supply hose.

One end of the ingredient channel P may be an ingredient inlet 281 through which the ingredient is introduced into the ingredient channel P, and the other end of the ingredient channel P may be an ingredient outlet 282 through which the ingredient introduced into the ingredient channel P comes out of the robot arm 200.

The robot arm 200 may be formed with an opening extending in the longitudinal direction of the robot arm 200. One example of the ingredient channel P may be the opening.

The opening may be formed in each of the robot connector 270, the arms 210, 220 and 230, the arm connectors 240 and 250, and the end effector 260 and the openings may be sequentially formed in the longitudinal direction of the robot arm 200 to communicate with each other. One example of the ingredient channel P may be formed by a combination of the openings sequentially located in the longitudinal direction of the robot arm 200.

Another example of the ingredient channel P may be formed by a hose or a tube T (hereinafter referred to as a tube) disposed through the opening formed in the robot arm 200. All or part of the tube T may be accommodated in the opening formed in the robot arm 200, and the ingredient channel P may be defined as the interior of the tube.

The robot arm 200 may be disposed to be spaced apart from the ingredient feeder 300, and the ingredient channel P may extend from the robot arm 200 to the ingredient feeder 300 so as to be connected to the ingredient feeder 300. In this case, the ingredient inlet 281 of the ingredient channel P may be connected to the ingredient feeder 300 at the outside of the robot arm 200.

The robot may include one robot arm 200*a* or may include a pair of robot arms 200*a* and 200*b*. The pair of robot arms 200*a* and 200*b* may cooperatively perform the cooking operation in a state in which they are spaced apart from each other, and when one of the two robots performs an ingredient input operation, the other one of the two robot arms may perform the other cooking operation instead of the ingredient input operation.

The ingredient channel P may be formed only in one of the pair of robot arms 200*a* and 200*b*, and the robot arm formed with the ingredient channel P between the robot arms 200*a* and 200*b* may perform various cooking operations including the ingredient input operation, and the robot arm in which the ingredient channel P is not formed between the pair of robot arms 200*a* and 200*b* may perform the other cooking operation instead of the ingredient input operation.

The ingredient channel P may be formed in both of the pair of robot arms 200*a* and 200*b*. In this case, the pair of robot arms 200*a* and 200*b* may input mutually different types of ingredients into the cooking container F during the entire cooking operation and may input the ingredient into the cooking container F at different times or simultaneously during the entire cooking operation.

The number of robot arms formed with the ingredient channel P may not be limited, and the robot arms will be denoted with reference numeral 200 in the following description.

Meanwhile, the robot arm 200 may be directly connected to the ingredient feeder 300, and the ingredient channel P may be provided inside the robot arm 200. In this case, the ingredient inlet 281 of the ingredient channel P may be connected to the ingredient feeder 300 at the robot arm 200, in particular, at the robot connector 260.

The robot arm 200 is not always connected to the ingredient feeder 300, but may be connected to the ingredient feeder 300 when the ingredient is supplied from the ingredient feeder 300.

The ingredient feeder 300 may process the food ingredient into a size and a shape that is easy to transfer. For example, the ingredient feeder 300 may process the food ingredient into a ball-shaped solid ingredient B. The ingredient feeder 300 may supply the solid ingredient B to the ingredient channel P, and the solid ingredient B may be introduced into the cooking container F through the ingredient outlet 282 of the ingredient channel P by passing through the ingredient channel P.

The ingredient channel P may be configured to quickly guide the ingredient supplied from the ingredient feeder 300, and it is advantageous that the ingredient that comes out through the ingredient outlet 282 is not discharged at too high a speed.

In addition, the ingredient feeder 300 may process the ingredient into a size smaller than a sectional area of the ingredient channel P, and the ingredient processed by the ingredient feeder 300 to a size smaller than the sectional area of the ingredient channel P may come out of the robot arm 200 by passing through the ingredient channel (P).

Figure 6:
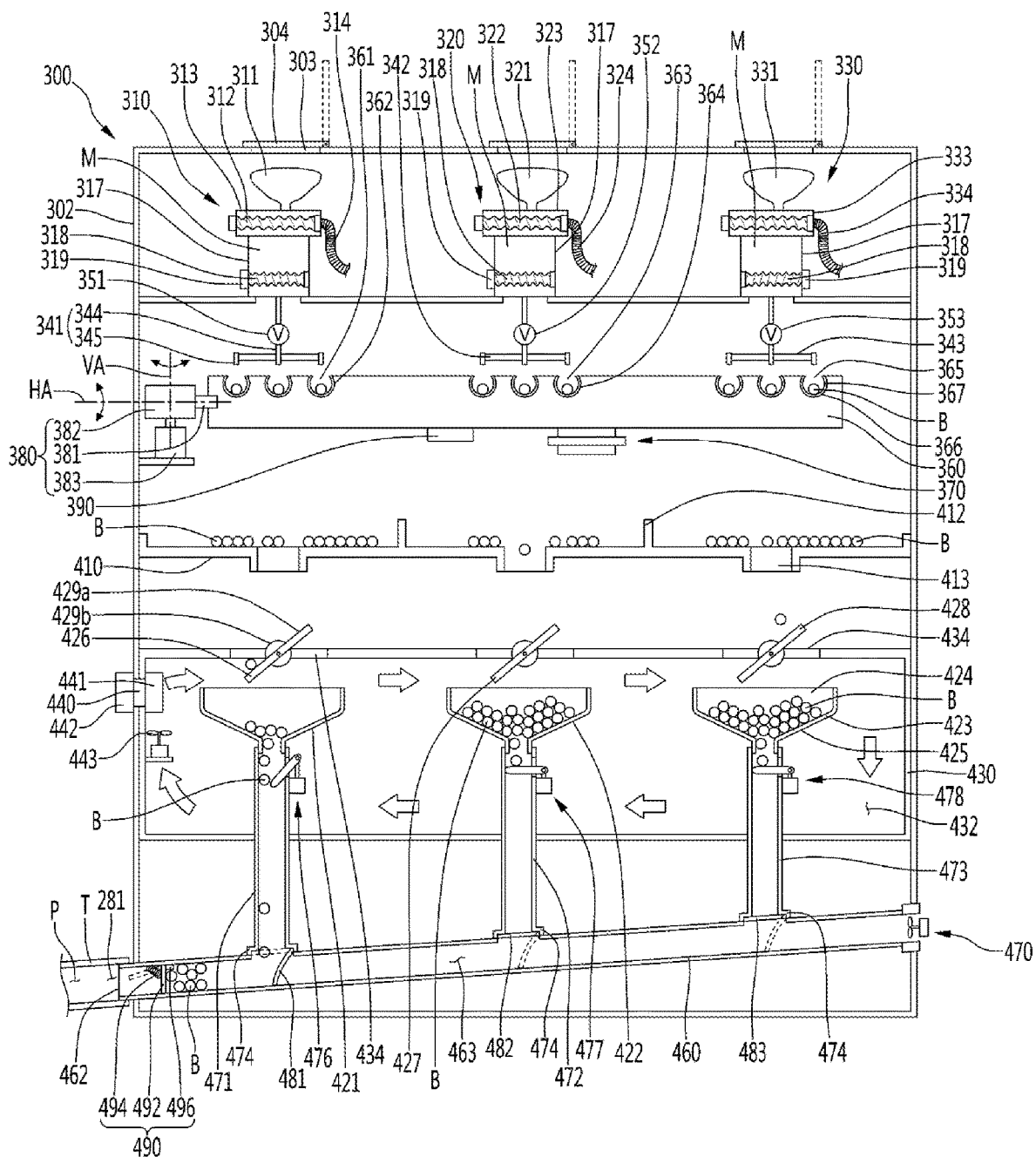
FIG. 6 is a view illustrating an interior of an ingredient feeder according to an embodiment.

FIG. 6 is a view illustrating the inside of the ingredient feeder according to an embodiment.

The food ingredient processed by the ingredient feeder 300 may be various ingredients required for food cooking. For example, the food ingredient may be a solid ingredient such as cucumber, carrot, onion, meat, red pepper, pepper, salt, or red pepper powder, or may be a liquid ingredient such as soy sauce, vinegar, and red pepper paste.

The solid ingredient may be classified into a powder ingredient such as pepper, salt and red pepper powder, and a general solid ingredient having a larger size than the powder ingredient. Examples of the general solid ingredient may be cucumber, carrot, onion, meat, and the like.

Among the solid ingredients, the solid ingredient having a smaller size than the ingredient channel P may be an ingredient that does not require grinding, and may be a powder ingredient such as pepper, salt, red pepper powder, and the like. In the following description, the above ingredients will be referred to as a powder ingredient for the sake of convenience.

The solid ingredient having a large size than the ingredient channel P in the solid ingredients may be an ingredient that needs to be ground to be processed to a size smaller than the sectional area of the ingredient channel P. For example, the solid ingredient having the large size than the ingredient channel P may be a general solid ingredient such as cucumber, carrot, onion, meat, etc. In the following description, these ingredients will be described as solid ingredients for the sake of convenience.

The ingredient feeder 300 may process a mixture M, in which the food ingredient is mixed with water, into the solid ingredient B, and supply the solid ingredient B to the ingredient channel P.

The ingredient feeder 300 may include at least one processor and an ingredient mold 360.

The ingredient feeder 300 may include an ingredient feeder case 302 forming an external appearance, and various components of the ingredient feeder 300 may be accommodated in the ingredient feeder case 302.

The ingredient feeder case 302 may be formed with an ingredient input port 303 for inputting the food ingredient from the outside. The ingredient feeder 300 may further include an ingredient input door 304 disposed in the ingredient feeder case 302 to open or close the ingredient input port 303. The ingredient input door 304 may be rotatably or slidably disposed in the ingredient feeder case 302 to open or close the ingredient input port 303. The ingredient input port 303 and the ingredient input door 304 may be provided for each processor.

The processor produces the mixture M by mixing the food ingredient with water and the processor may mix various food ingredients with water to primarily process into the mixture M of the ingredient and water.

The ingredient mold 360 may secondary process the mixture M produced by the processor into a solid ingredient B of a predetermined size and a predetermined shape.

The ingredient mold 360 may be spaced apart from the processor. The ingredient mold 360 may be formed with a space portion defining a space in which the mixture supplied from the processor is accommodated. The space portion may be formed in a shape recessed in the ingredient mold 360.

The mixture M produced by the processor may be supplied to the space portion and accommodated in the space portion and may be processed into the same or similar shape as the shape of the space portion in the space portion.

The ingredient feeder M may be provided with a plurality of processors 310, 320 and 330. The plurality of processors 310, 320 and 330 may process the same kind of food ingredient.

All or part of the plurality of processors 310, 320 and 330 may process different kinds of food ingredients. For example, one 310 of the plurality of processors 310, 320 and 330 may mix the solid ingredient with water, and another one 320 of the plurality of processors 310, 320 and 330 may mix the powdered ingredient with water, and another one 330 of the plurality of processors 310, 320 and 330 may mix the liquid ingredient with water.

The plurality of processors 310, 320 and 330 may include a solid ingredient processor 310 that produces a mixture by mixing the solid ingredient with water while grinding the solid ingredient. The plurality of processors 310, 320 and 330 may include a powder ingredient processor 320 for mixing the powder ingredient with water to produce a mixture. The plurality of processors 310, 320 and 330 may include a liquid ingredient processor 330 that mixes the liquid ingredient with water to produce a mixture.

The solid ingredient processor 310, the powder ingredient processor 320, and the liquid ingredient processor 330 may be provided in singular or plural in the ingredient feeder.

Each of the solid ingredient processor 310, the powder ingredient processor 320, and the liquid ingredient processor 330 may produce a mixture of food ingredients mixed with water. In the following description, the processors 310, 320 and 330 will be described when explaining the common configuration and the solid ingredient processor 310, the powder ingredient processor 320 and the liquid ingredient processor 330 will be distinguishably described when explaining the different configurations.

The processors 310, 320 and 330 may include a storage container 317 in which the produced mixture is contained, a rotating body 318 rotatably disposed in the storage container 317 to allow the mixture contained in the storage container to flow, and a motor 319 to rotate the rotating body 318.

The storage container 317, the rotating body 318 and the motor 319 may allow the mixture M to flow in the storage container 317 such that the mixture M may be kept in a shape of a slush or similar to the slush without being solidified.

The storage container 317, the rotating body 318 and the motor 319 may be provided regardless of the type of the processor and denoted with the same reference numerals regardless of the type of the processor.

The solid ingredient processor 310, which is one example of the processor, may include a solid ingredient inlet 311 into which solid ingredients are introduced from among the food ingredients, a grinder 311 configured to contain the solid ingredients introduced into the solid ingredient inlet 311 and provided therein with a grinding rotor 312 rotatably installed, a water tube 314 configured to guide water into the grinder, and a storage container 317 configured to contain a mixture of water and the solid ingredients, which are pulverized in the grinder 313, in the form of a slush. The rotating body 318 rotated by a motor 319 may be provided in the storage container 317.

The powder ingredient processor 320, which is another example of the processor, may include a powder ingredient inlet 321 into which powder ingredients having a size smaller than a size of solid ingredients are introduced from among the food ingredients, a mixer 323 configured to contain the powder ingredients introduced into the powder ingredient inlet 321, in which a conveying screw 322 is rotatably installed in the mixer 323, a water tube 324 configured to guide water into the mixer 323, and a storage container 317 configured to contain a mixture of liquid ingredients and the water mixed in the mixer 323. The rotating body 318 rotated by a motor 319 may be provided in the storage container 317.

The liquid ingredient processor 330, which is still another example of the processor, may include a liquid ingredient inlet 331 into which liquid ingredients are introduced from among the food ingredients, a mixer 333 configured to contain the liquid ingredients introduced into the liquid ingredient inlet 331, a water tube 334 configured to guide water into the mixer 333, and a storage container 317 configured to contain a mixture of the liquid ingredients and the water mixed in the mixer 333. The rotating body 318 rotated by a motor 319 may be provided in the storage container 317.

The ingredient feeder M may further include a mixture guide configured to guide the mixture produced in the processors 310, 320 and 330 into the space portion of the ingredient feeder 300.

The mixture guide may be connected to the storage container 317 and may guide the mixture of the storage container 317 to a plurality of space portions formed in the ingredient mold.

When the ingredient feeder 300 includes a plurality of processors 310, 320 and 330, the ingredient feeder 300 may include a plurality of mixture guides 341, 342 and 343. The plurality of processors 310, 320 and 330 may correspond to the plurality of mixture guides 341, 342 and 343 in one to one correspondence.

The plurality of mixture guides 341, 342, and 343 may include a first mixture guide 341 connected to the storage container 317 of the solid ingredient processor 310, a second mixture guide 342 connected to the storage container 317 of the powder ingredient processor 320, and a third mixture guide 343 connected to the storage container 317 of the liquid ingredient processor 330.

The first mixture guide 341, the second mixture guide 342, and the second mixture guide 343 will be referred to as the mixture guides 341, 342, and 343 when describing the common configuration.

The mixture guides 341, 342 and 343 may include a common guide 344 connected to the processors 310, 320 and 330, and a plurality of branch guides 345 branching from the common guide 344. The plurality of branch guides 345 may disperse the mixture guided through the common guide 344.

The ingredient feeder 300 may further include a feed valve disposed in the processor or the mixture guide.

The feed valve may be disposed at the mixture outlet formed in the storage container 317 of the processor, and may be disposed between the mixture outlet and the common guide 314, or may be disposed at the common guide 314.

The feed valve may allow the mixture of the processor to be supplied to the ingredient mold 360 and prevent the mixture of the processor from being supplied to the ingredient mold 360. One example of the feed valve may be a solenoid valve. However, the feed valve of the present disclosure is not limited to the solenoid valve, but various types of feed valves may be used as long as the feed valves can control the mixture in the storage container 317.

When the ingredient mold 360 includes a plurality of processors 310, 320 and 330, the feed valve may be provided for each of the processors 310, 320 and 330. The plurality of processors 310, 320, and 330 may include a first feed valve 351 configured to control the mixture produced by the solid ingredient processor 310, a second feed valve 352 configured to control the mixture produced by the powder ingredient processor 320, and a third feed valve 353 configured to control the mixture produced by the liquid ingredient processor 330. The first feed valve 351, the second feed valve 352, and the third feed valve 353 will be described as the feed valves 351, 352, and 353 when explaining the common configuration.

The ingredient mold 360 cools the food ingredient into a solid ingredient, in which the mixture of the food ingredient and water processed in the processors 310, 320 and 330 may be cooled by the ingredient mold 360, and processed into a solid processed ingredient M having a predetermined shape. Since the solid processed ingredient is in a solid state, the solid processed ingredient will be referred to as a solid ingredient (B) below.

When a plurality of processors 310, 320 and 330 are provided, the number of ingredient molds 360 may be smaller than the number of processors 310, 320 and 330. One ingredient mold 360 may cool the mixtures produced in the plurality of processors 310, 320 and 330 together.

Meanwhile, the present disclosure is not limited to one ingredient mold 360, but may include a plurality of ingredient molds. The ingredient mold may be provided for each of the processors 310, 320 and 330. Hereinafter, the description will be made with respect to one ingredient mold 300 for the sake of convenience.

The space defined by the space portions of the ingredient mold 360 may be a mold space for freezing the mixture into a predetermined shape. The ingredient mold 360 may have a three-dimensional shape, and the space portion may be formed on one surface of the ingredient mold 360.

The mold space may be formed in the ingredient mold 360 for each of the plurality of processors, and a plurality of space portions may be provided in the ingredient mold 360. The plurality of space portions may be formed together on one surface of the ingredient mold 360. The plurality of space portions may be formed on the top surface of the ingredient mold 360.

When the ingredient mold 360 includes the first, second and third processors 310, 320 and 330, the ingredient mold 360 may be formed with a plurality of first space portions 362 having a space 361 in which the mixture supplied from the first processor 310 is accommodated, a plurality of second space portions 364 having a space 363 in which the mixture supplied from the second processor 320 is accommodated, and a plurality of third space portions 366 having a space 365 in which the mixture supplied from the third processor 330 is accommodated.

The plurality of first space portions 362 may correspond to the plurality of branch guides 345 of the first mixture guide 341 in one to one correspondence, and the mixture passing through the first mixture guide 341 may be dispersively accommodated in the plurality of first space portions 362.

The plurality of second space portions 364 may correspond to the plurality of branch guides 345 of the second mixture guide 342 in one to one correspondence, and the mixture passing through the second mixture guide 342 may be dispersively accommodated in the plurality of second space portions 364.

The plurality of third space portions 366 may correspond to the plurality of branch guides 345 of the third mixture guide 343 in one to one correspondence, and the mixture passing through the third mixture guide 343 may be dispersively accommodated in the plurality of third space portions 366.

The plurality of first space portions 362, the plurality of second space portions 364, and the plurality of third space portions 366 may have the same shape and size, and the plurality of first space portions 362, the plurality of second space portions 364, and the plurality of third space portions 366 may be described as space portions 362, 364 and 366 when explaining the common configuration.

The shape of the solid ingredient may be determined by the shape of the space portions 362, 364 and 366, and the space portions 362, 364 and 366 may have sectional shapes of circular balls or elliptical balls.

The space portions 362, 364, 366 may have sectional shapes of semi-circles or arcs, in particular, major arcs.

The ingredient mold 360 may include a coating layer 367 formed on the space portions 362, 364, 366. The coating layer 367 may be one selected from the group consisting of titanium, marble and diamond. The coating layer 367 may be formed in each of the plurality of space portions 362, 364 and 366, and may have the shape the same as the space portions 362, 364 and 366. If the ingredient mold 360 includes the coating layer 367, the space in which the mixture is accommodated may be substantially defined by the coating layer 367.

The ingredient feeder 300 may further include a cooler 370 configured to cool the ingredient mold 360.

Cooler 370 may include a thermoelectric element secured to the ingredient mold 360.

The cooler 370 may be disposed on the side or the bottom of the ingredient mold 360. The ingredient mold 360 may be formed with a thermoelectric element accommodating groove into which the thermoelectric element is accommodated, and the thermoelectric element may be inserted into and accommodated in the thermoelectric element accommodating groove.

The ingredient feeder 300 may include a rotating device 380 for rotating the ingredient mold 360. The rotating device 380 may rotate the ingredient mold 360 in a plurality of directions different from each other.

The rotating device 380 may three-dimensionally shake the ingredient mold 360. When the rotating device 380 operates, the mixture contained in the space portions 362, 364 and 366 may three-dimensionally flow in the space portions 362, 364 and 366 while losing heat by the space portions 362, 364 and 366. Water components in the mixture may be embanked due to heat absorption of the ingredient mold 360, the shape of the space portions 362, 364 and 366, and the three-dimensional shaking of the ingredient mold 360.

If the heat absorption of the ingredient mold 360 and the shaking of the ingredient mold 360 continue for a predetermined time, the slush-type mixture that has been supplied to the space portions 362, 364 and 366 may be processed into a ball-shaped solid ingredient.

The rotating device 380 includes a rotating shaft 381 connected to the ingredient mold 360, a first motor 382 for rotating the rotating shaft 381 in the first direction, and a second motor 383 for rotating the rotating shaft 381 in the second direction different from the first direction.

The rotating shaft 381 may be a horizontal shaft connected to one side of the ingredient mold 360.

The first motor 382 may rotate the ingredient mold 360 such that the ingredient mold 360 is tilted about a horizontal axis HA. When the first motor 382 is driven, the ingredient mold 360 may rotate forward and backward about the horizontal axis HA.

The second motor 383 may rotate the first motor 382 such that the first motor 382 and the ingredient mold 360 may rotate about the vertical axis VA. When the second motor 383 is driven, the first motor 382 and the ingredient mold 360 may rotate forward and backward about the vertical axis VA.

When the first motor 382 is driven, if the second motor 383 is driven together, the ingredient mold 360 may be tilted about the vertical axis VA, and the ingredient mold 360 may cool the mixture M contained in the space portions 362, 364 and 366 into a ball shape while gently rolling the mixture M.

The rotating device 380 may turn over the ingredient mold 360. The rotating device 380 may turn over the ingredient mold by 180° about the horizontal axis HA such that the surface (for example, the upper surface) on which the space portions 362, 364 and 366 of the ingredient mold 360 are formed faces downward. When the surface of the ingredient mold 360 on which the space portions 362, 364, and 366 are formed faces downward, the ball-shaped solid ingredient B accommodated in the space portions 362, 364 and 366 may fall downward.

The rotating device 380 may stop the operation of the second motor 383 when the first motor 382 and the second motor 383 have been driven for a predetermined time. In addition, after the operation of the second motor 383 is stopped, the first motor 382 may rotate the rotating shaft 381 by 180° and then restore the rotating shaft 181.

An exciter 390 may be installed on the ingredient mold 360. The exciter 390 may apply a vibration to the ingredient mold 360 so prevent the mixture cooled in the space portions 362, 364 and 366 from being attached to the space portions 362, 364 and 366. The exciter 390 may be installed on one side of the ingredient mold 360. The ingredient mold 360 may be formed with an exciter receiving groove in which the exciter 390 is accommodated, and the exciter 390 may be inserted into and accommodated in the exciter receiving groove. One example of the exciter 390 may include a high frequency generator fixed to the ingredient mold 360. Meanwhile, the exciter 390 is not limited to the high frequency generator, and various types of exciters can be used as long as the exciters can excite the ingredient mold 360.

The processors 310, 320 and 330 and the ingredient mold 360 may constitute a processing module for processing the food ingredient into the solid ingredient, and the solid ingredient processed in the processing module may be temporarily stored in the storage container.

The ingredient feeder 300 may include a common storage container 410 in which the solid ingredient transferred from the ingredient mold 360 is stored.

The common storage container 410 may include a barrier 412 that divides the common storage container 410 into a plurality of storage spaces such that storage spaces are formed for each of the processors 310, 320, and 330.

The common storage container 410 may be spaced apart from the ingredient mold 260 in the vertical direction at the lower portion of the ingredient mold 260. When the upper surface of the ingredient mold 260 faces downward, the ball-shaped solid ingredient B falling down from the space portions 362, 364 and 366 of the ingredient mold 260 may fall into the common storage container 410.

The common storage container 410 may be formed with an opening 413 at the lower side of the storage space, in which the ball-shaped solid ingredient falls into the opening 413. The openings 413 may be formed for each storage space, and the number of the openings 413 may be equal to the number of storage spaces.

The ingredient feeder 300 may not include the common storage container 410 separately. In this case, the solid ingredient B falling onto the ingredient mold 360 may fall down toward the storage space 424 of the storage containers 421, 422, and 423 described below.

The ingredient feeder 300 may be formed with an ingredient port 462 for discharging the processed ingredient. The ingredient feeder 300 may process the ingredient such that the ingredient has a size smaller than a sectional area of the ingredient channel P, and then discharge the processed ingredient B to the ingredient port 462.

The robot arm 200 shown in FIGS. 4 and 5 may receive the solid ingredient B from the ingredient port 462, and the supplied solid ingredient may be guided to the ingredient channel P.

The robot arm 200, in particular, the ingredient inlet 281 of the ingredient channel P may be connected to the ingredient port 462 of the ingredient feeder 300. The ingredient processed in the ingredient feeder 300 may be supplied to the ingredient channel P through the ingredient port 462 and the ingredient inlet 281.

The ingredient feeder 300 may include a transfer module (or dispenser module) for moving the ball-shaped solid ingredient B processed in the ingredient mold 260 to the robot arm 200.

The ingredient feeder 300 may further include at least one storage container in which the solid ingredient moved from the ingredient mold 260 is contained.

The ingredient feeder 300 may include a plurality of storage containers 421, 422, and 423. The plurality of storage containers 421, 422, and 423 may include a first storage container 421 in which an ingredient processed in the first space portion 362 is accommodated. The plurality of storage containers 421, 422, and 423 may include a second storage container 422 in which the ingredient processed in the second space portion 364 is accommodated. The plurality of storage containers 421, 422, and 423 may include a third storage container 423 in which the ingredient processed in the third space portion 366 is accommodated.

The plurality of storage containers 421, 422, and 423 may be spaced apart from each other. The plurality of storage containers 421, 422, 423 may be spaced apart from each other in the horizontal direction. The first storage container 421, the second storage container 422, and the third storage container 423 may have the same structure and shape. In the following description, the first, second and third storage containers may be described as the storage containers 421, 422, and 423 when explaining the common configuration.

Storage spaces 424 in which the solid ingredient B is stored may be formed in the storage containers 421, 422, and 423. An upper portion of the storage space 424 may have a shape that gradually narrows downward. The storage containers 421, 422, and 423 may include an upper storage part 425 having a size gradually reduced downward and a trapezoidal sectional shape. The solid ingredient moved from the ingredient mold 260 to the storage containers 421, 422 and 423 may be temporarily stored in the storage space 424.

The solid ingredient B falling down from the ingredient mold 260 or the common storage container 410 may be directly dropped into the storage containers 421, 422, and 423, and moved to the storage containers 421, 422, and 423 while being guided by a separate guide.

The ingredient feeder 300 may further include a guide for guiding the solid ingredient dropped from the ingredient mold 260 into the storage space 424. The guide may be disposed between the ingredient mold 260 and the storage container. The guide may have an inclined surface 429a inclined toward the storage space 424. The inclined surface 429a may be an upper surface of the guide. The guide may be placed on the storage container while being tilted. A lower end of the guide may face the storage space 424.

The guide may be rotatably disposed on the storage container, and may be rotated to open or close the opening 434 of the cooling chamber 430 which will be described below. The guide may be connected to a rotating device 429b such as a motor capable of rotating the guide. The rotating device 429b may rotate the guide such that a lower end of the guide faces the storage space 242, and may rotate the guide to seal the opening 434 by blocking the opening 434.

The ingredient mold 300 may include a plurality of guides 426, 427 and 428. The plurality of guides 426, 427, and 428 may be provided for the storage containers 421, 422, and 423, respectively. The guides 426, 427 and 428 may correspond to the storage containers 421, 422, and 423 in one to one correspondence.

The plurality of guides 426, 427, and 428 may include a first guide 426 for guiding the solid ingredient to the first storage container 421, a second guide 427 for guiding the solid ingredient to the second storage container 422, and a third guide 428 for guiding the solid ingredient into the third container 423.

The ingredient feeder 300 may further include a cooling chamber 430 in which the storage container is accommodated while being kept in a low temperature condition. The cooling chamber 430 may have a cooling space 432 to accommodate the storage container.

The cooling chamber 430 may be an adiabatic chamber having a cooling space 432 formed therein, and may be formed at an upper portion thereof with an opening 434 through which the solid ingredient passes.

The ingredient mold 360 may be disposed on the cooling chamber 340 while being spaced apart from the storage container.

The cooling chamber 430 may have an opening 434 formed at an upper portion of the storage container.

The opening 434 may be formed between the ingredient mold 360 and the storage container in the cooling chamber 430, and the solid ingredient falling down from the ingredient mold 36 may move to the storage containers 421, 422 and 433 by passing through the opening 434.

The opening 434 may be formed for each of the storage containers 421, 422, 433. The cooling chamber 430 may include a first opening formed above the first storage container 421, a second opening formed above the second storage container 422, and a third opening formed above the third storage container 423.

The ingredient feeder 300 may further include a cooler 440 that can cool the storage container. The cooler 440 may be installed to cool the cooling space 432. The cooler 440 may be configured as a refrigeration cycle apparatus including a compressor, a condenser, an expansion device, and an evaporator, and may also be configured as a thermoelectric element including a heat absorption body 441 and a heat dissipation body 442.

The ingredient feeder 300 may further include a cooling fan 443 which circulates the air in the cooling chamber 430 to the evaporator or the heat absorption body and then circulates the air into the cooling chamber 430.

In the ingredient feeder 300, the evaporator or the heat absorption body may be attached to the storage container such that the evaporator or the heat absorption body can absorb the heat of storage container in a conductive manner.

Ingredient feeder 300 may include a feed tube 460. The feed tube 460 may be formed with an ingredient port 462 and a passage 463 to guide the ingredient to the ingredient port 462.

The feed tube 460 may be inclined in a direction that is gradually lowered toward the ingredient port 462.

The passage 433 may be a space in which the solid ingredient may be moved, or may be a space in which the solid ingredient may be temporarily received/stored. The solid ingredient B stored in the storage container may be moved to the feed tube 360 and stored in the feed tube 360, and then moved to the outside through the ingredient port 462 of the feed tube 360.

The ingredient feeder 300 may further include a solid ingredient transfer device for forcibly moving the solid ingredient. The solid ingredient transfer device may forcibly move the solid ingredient B in the feed tube 460 toward the ingredient port 462.

One example of the solid ingredient transfer device may include a push body movably accommodated in the feed tube 360 to push the solid ingredient in the feed tube 460, and a linear carrier, such as a motor, connected to the push body to linearly move the feed tube 360.

The push body may move forward in the direction in which the ingredient port 462 is located to push the solid ingredient in the feed tube 360 towards the ingredient port 462. The push body may be retracted in the direction opposite to the ingredient port 462.

Another example of the solid ingredient transfer device may be a feeder 470 that supplies a high pressure fluid to the passage 463 such that the solid ingredient in the passage 463 is moved by the high pressure fluid.

The ingredient feeder 300 may include a feeder 470 for moving the solid ingredient moved to the feed tube 460 to the ingredient port 462. The feeder 470 may move the solid ingredient to the ingredient port 462 by the pressure of the air, and an example of the feeder 470 may include a blower for supplying air to the passage 463. The blower may be disposed opposite to the ingredient port to provide pneumatic pressure to the passage. For the sake of convenience, the feeder and the blower will be denoted with reference numeral 470.

The blower 470 may be installed opposite to the ingredient port 462 and may flow high pressure air into the passage 463. The high pressure air flowing from the blower 470 into the passage 463 can function as a solid ingredient connector that causes the solid ingredient in the passage 463 to flow toward the ingredient port 462.

The ingredient feeder 300 may further include a transfer tube connecting the storage containers 421, 422 and 423 and the feed tube 460. The transfer tube may guide the solid ingredient B stored in the storage container to the passage 463 of the feed tube 460. An upper portion of the transfer tube may be connected to the storage container, a lower portion of the transfer tube may be connected to the feed tube 460 and the solid ingredient in the storage container may be moved to the passage 463 of the feed tube 460 by passing through the transfer tube.

A plurality of transfer tubes may be provided and the plurality of transfer tubes may correspond to the storage containers 421, 422, and 423 in one to one correspondence. The plurality of transfer tubes may include a first transfer tube 471 connecting the first storage container 421 and the feed tube 460, a second transfer tube 472 connecting the second storage container 422 and the feed tube 460, and a third transfer tube 473 connecting the third storage container 423 and the feed tube 460.

Hereinafter, the first transfer tube 471, the second transfer tube 472, and the third transfer tube 473 will be described as the transfer tubes 471, 472, and 473 when explaining the common configuration.

Each of the plurality of transfer tubes 471, 472 and 473 may include a connection terminal 474 connected to the feed tube 460. The connection terminals 474 of the plurality of transfer tubes 471, 472, and 473 may be spaced apart from each other in the longitudinal direction of the feed tube 460.

The plurality of storage containers 421, 422, and 423 may be arranged in parallel to each other to have the same height, and the plurality of transfer tubes 471, 472, and 473 may have lengths which increase as they are closer to the ingredient port 462.

The ingredient feeder 300 may further include a control valve for controlling the drop of the solid ingredient located in the storage container.

The control valve may open or close the interior of the transfer tubes 471, 472 and 473 in the transfer direction of the solid ingredient.

When the ingredient feeder 300 includes a plurality of storage containers 421, 422, and 423, the ingredient feeder 300 may include a plurality of control valves 476, 477, and 478. The plurality of control valves 476, 477, and 478 may include a first control valve 476 to control the solid ingredient moved to the first transfer tube 471, a second control valve 477 to control the solid ingredient moved to the second transfer tube 472, and a third control valve 478 to control the solid ingredient moved to the third transfer tube 473.

Hereinafter, the first control valve 476, the second control valve 477 and the third control valve 478 will be described as the control valves 476, 477 and 478 when explaining the common configuration.

The control valves 476, 477 and 478 may be disposed at the outlet of the storage containers 421, 422 and 423 or at the top of the transfer tube.

The control valves 476, 477 and 478 may be opened and closed for a time during which the plurality of solid ingredients in the storage container drop one by one.

The controller 180 may count the number of operations of the control valves 476, 477 and 478. The controller 180 may stop the opening/closing operation of the control valve to stop the input of the ingredient when the number of times of the operation is equal to or more than the preset number of times.

The ingredient feeder 300 may further include an intermediate valve disposed at a lower portion of the transfer tube. The intermediate valve may be an elastic plug that opens the transfer tube while being deformed by the solid ingredient dropped from the storage container.

The intermediate valve may be a one-way valve that prevents air in the feed tube 460 from entering the transfer tubes 471, 472 and 473, and allows the solid ingredient in the transfer tubes 471, 472 and 473 to move to the feed tube 460.

A plurality of intermediate valves may be provided, and the plurality of intermediate valves may be provided for each of the transfer tubes 471, 472, and 473. The plurality of intermediate valves may include a first intermediate valve 481 disposed in the first transfer tube 471, a second intermediate valve 482 disposed in the second transfer tube 472, and a third intermediate valve 483 disposed in the third transfer tube 473.

The ingredient feeder 300 may further include a variable stopper 490. The variable stopper 490 may be disposed in the passage 464. The variable stopper 490 may prevent the solid ingredient from moving to the ingredient outlet 362 when the operation of the feeder 470 is stopped. The variable stopper 490 may allow the solid ingredient to move to the ingredient port 462 during the operation of the feeder 470.

The variable stopper 490 may be a valve device that is opened or closed by the feeder 470.

The variable stopper 490 may include a stopper 492 and a spring 494.

The stopper 492 may be rotatably disposed in the passage 463.

The spring 494 may elastically support the stopper 492 such that the stopper 492 rotates in the direction of blocking the passage 463.

The variable stopper 490 may further include a limiter 496 disposed in the passage 463 and latched when the stopper 492 is in a direction of blocking the passage 463.

The feeder 470 may include a blower for blowing air having a preset pressure or above to the stopper 492. The preset pressure may be a pressure that causes the stopper 492 to rotate in the direction of opening the passage 463.

Figure 7:
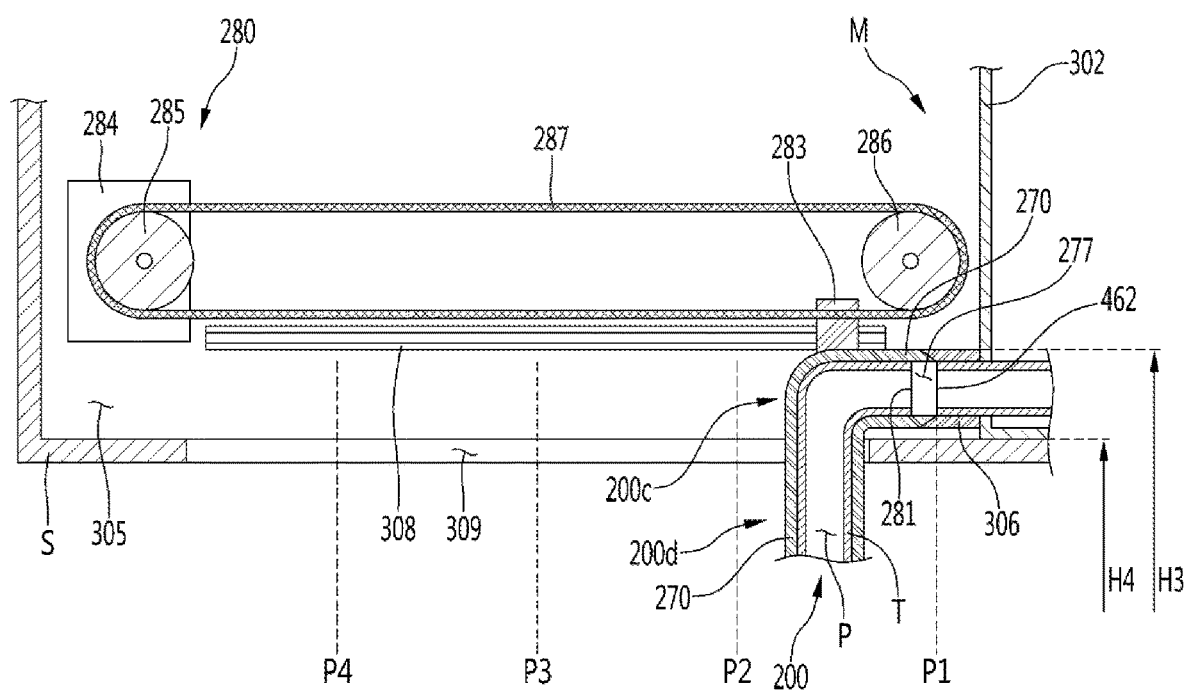
FIG. 7 is a sectional view when ae robot arm is connected to an ingredient feeder according to an embodiment.
Figure 8:
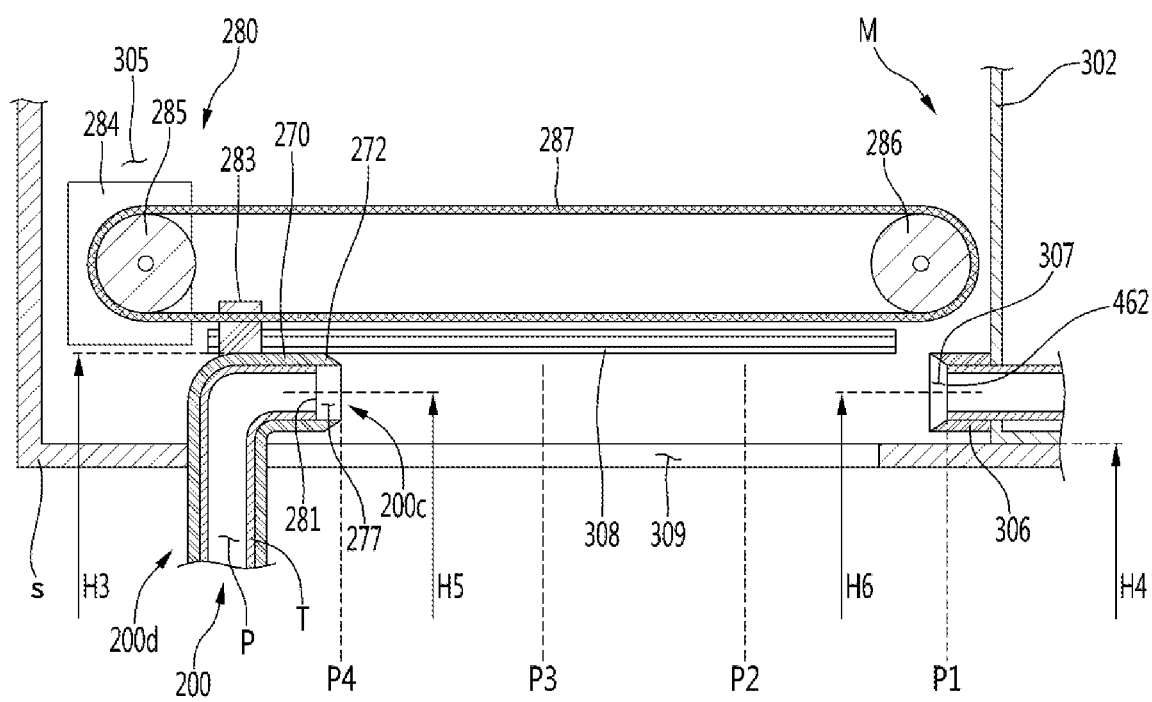
FIG. 8 is a sectional view when a robot arm is separated from an ingredient feeder according to an embodiment.
Figure 9:
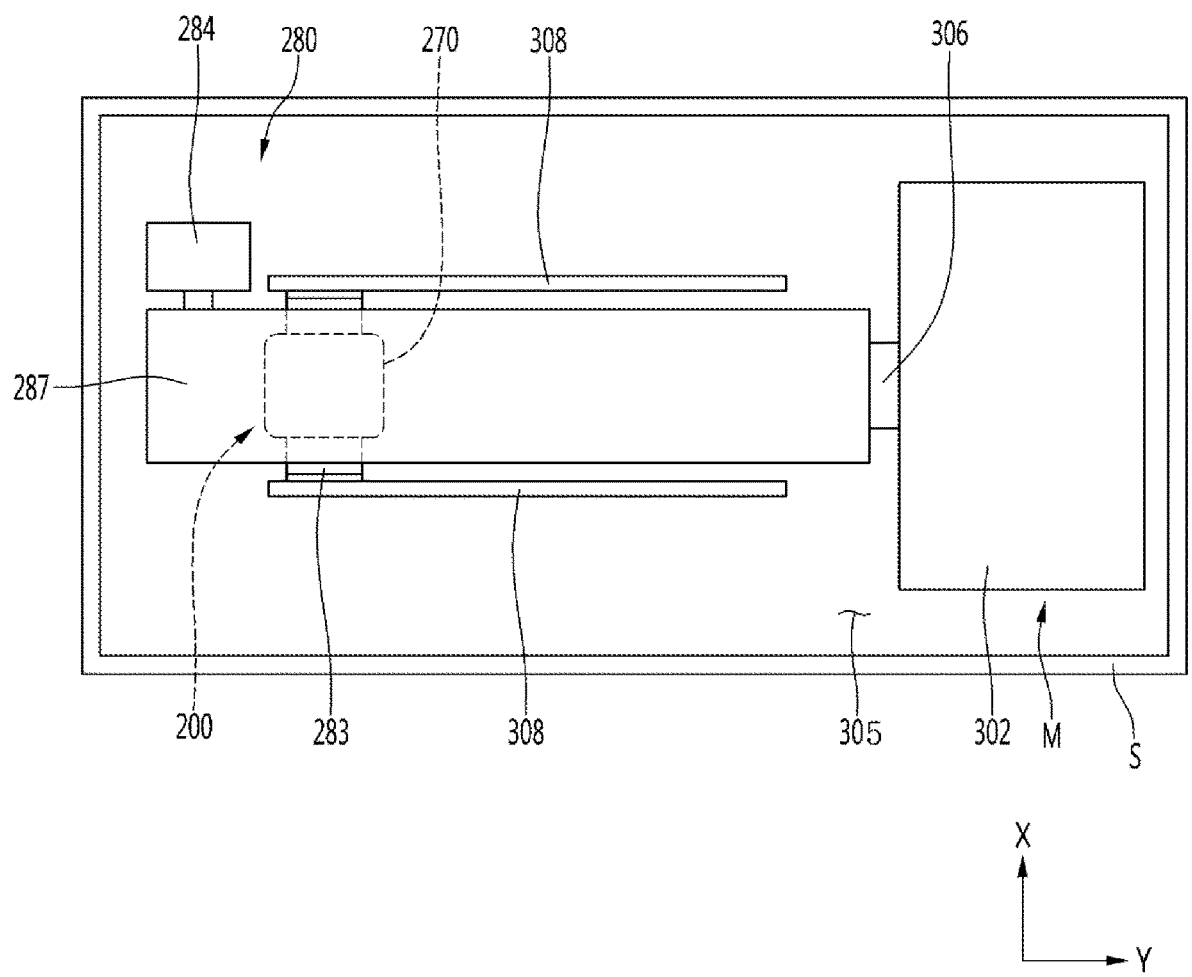
FIG. 9 is a plan view when a robot arm is separated from an ingredient feeder according to an embodiment.

FIG. 7 is a sectional view when ae robot arm is connected to an ingredient feeder according to an embodiment, FIG. 8 is a sectional view when a robot arm is separated from an ingredient feeder according to an embodiment and FIG. 9 is a plan view when a robot arm is separated from an ingredient feeder according to an embodiment.

As shown in FIGS. 7 to 9, the robot may include a carrier 280 for moving the robot arm 200.

As shown in FIG. 7, the carrier 280 may move the robot arm 200 to a connection position P1 where the ingredient inlet 281 is connected to the ingredient port 462.

As shown in FIG. 8, the carrier 280 may move the robot arm 200 to positions P2, P3 and P4 where the ingredient inlet 281 is separated from the ingredient port 462.

The robot may further include a case S in which the space 305 is formed. The case S may be furniture, such as a shelf in which the ingredient feeder M is accommodated, and may be constituted by separate members other than furniture.

The ingredient feeder M and the carrier 280 may be accommodated in the space 305 and protected by the case S.

A guide rail 308 may be provided in the case S to guide the robot arm 200 such that the robot arm 200 moves back and forth with respect to the ingredient feeder 300.

In addition, the case S is formed with a robot arm through hole 309 which extends in the movement direction Y of the robot arm 200a such that the robot arm 200 may pass through the robot arm through hole 309.

The guide rail 308 may be elongated in the direction along which the carrier 280 moves the robot arm 200. The guide rail 308 may be elongated in the horizontal direction (Y).

The guide rail 308 may be disposed to be positioned around the robot arm through hole 309, and guide the linear movement of the connector 283, which will be described below. The guide rail 308 may be a fixed rail fixedly mounted onto a lower plate of the case S. A pair of guide rails 308 may be provided inside the case S, and the pair of guide rails 308 may be spaced apart from each other in a direction X orthogonal to the moving direction Y of the connector 283.

The robot arm through hole 309 may be formed through the lower plate of the case (S) in the vertical direction Z.

The robot arm 200 may include a concealment portion 200c accommodated in a space 305 of the case S and covered by the case S, and an exposure portion 200d located outside the case S.

The concealment portion 200c and the exposure portion 200d may be distinguished based on whether they are exposed to the outside from the robot arm 200, and the concealment portion 200c is positioned above the robot arm through hole 309 and the exposure portion 200d is positioned below the robot arm through hole 309.

The ingredient inlet 281 may be located in the concealment portion 200c, and the concealment portion 200c including the ingredient inlet 281 may be connected to or separated from the ingredient feeder 300.

The ingredient outlet 282 (see FIG. 5) may be located in the exposure portion 200d. The exposure portion 200d may include an ingredient outlet 282, and may be placed in a position where the ingredient falls into the ingredient container F.

A first connector 270 may be provided to any one of the robot arm 200 or the ingredient feeder 300. In addition, a second connector 306, which is connected to or disconnected from the first connector 270, may be provided to another one of the robot arm 200 or the ingredient feeder 300.

The first connector 270 may be a robot connector 270 provided to the robot arm 200 to connect the robot arm 200 with other objects other than the robot arm, hereinafter, the robot connector and the first connector will be denoted with the same reference numeral.

The second connector 306 may be provided to the ingredient feeder 300, and may be provided at a position where the second connector 306 may be connected to the first connector 270 of the robot arm 200 when the robot arm 200 moves. The second connector 306 may be fixedly positioned on the ingredient feeder 300.

One of the first connector 270 or the second connector 306 may include an insertion portion 272 inserted to the other of the first connector and the second connector. The first connector 270 and the second connector 306 may be sealed by the insertion portion 272. The insertion portion 272 may facilitate the initial insertion of the first connector 270 when the first connector 270 is connected to the second connector 306.

One example of the robot is that the ingredient inlet 281 of the ingredient channel P and the ingredient port 462 of the ingredient feeder 300 may be exactly matched when the first connector 270 and the second connector 306 are connected.

Another example of the robot is that, when the first connector 270 and the second connector 306 are connected, one of the ingredient inlet 281 of the ingredient channel P or the ingredient port 462 of the ingredient feeder 300 may be formed smaller than the other one, and located inside the other one.

Still another example of the robot is that, when the first connector 270 and the second connector 306 are connected, the ingredient inlet 281 of the ingredient channel P and the ingredient port 462 of the ingredient feeder 300 may be located inside the first connector 270 or the second connector 306 or the ingredient inlet 281 of the ingredient channel P and the ingredient port 462 of the ingredient feeder 300 may be spaced apart from each other in the ingredient transfer direction. Connector channels 277 and 307 through which the ingredient passes may be formed in at least one of the first connector 270 or the second connector 306. The ingredient port 462 and ingredient inlet 271 may face the connector channels 277 and 307 and may communicate through the connector channels 277 and 307. The ingredient processed in the ingredient feeder 300 may sequentially pass through the ingredient port 462, the connector channels 307 and 277, and the ingredient inlet 281, and then move to the ingredient channel P.

The first connector 270 may be arranged to surround a portion of the tube T forming the ingredient channel P. The first connector 270 may have a hardness higher than that of the tube T, and the tube T may be formed of a flexible ingredient that can be bent, while the first connector 270 may be formed of a hard material to support the flexible tube T.

One example of the second connector 306 may be configured separately from the feed tube 460. In this case, the second connector 306 may surround a portion of the feed tube 460. The second connector 306 may be arranged to surround the outer circumference of a portion of the feed tube 460 forming the ingredient port 462.

Another example of the second connector 306 is that the second connector 306 may be a part of the feed tube 460. In this case, the first connector 270 may be inserted into the ingredient port 462 of the feed tube 460 or may surround the outer circumference of the feed tube 460.

The top height H3 of the robot arm 200 may be higher than the bottom height H4 of the ingredient feeder 200. The height H5 of the ingredient inlet 281 and the height H6 of the ingredient port 462 may be the same. The ingredient inlet 281 and the ingredient port 462 may be spaced apart from each other in the horizontal direction Y.

The carrier 280 may move the robot arm 200 in the horizontal direction Y.

The carrier 280 may include a connector 283 to which the robot arm 200 is connected, a motor 284 and at least one power transmission member 285, 286, and 287 configured to transmit the driving force of the motor 284 to the connector and linearly move the connector 284.

The power transmission members 285, 286 and 287 may include a pair of pulleys 285 and 286 and a belt 287 wound around the pair of pulleys 285 and 286.

The motor 284 may rotate at least one of the pair of pulleys 285 and 286.

The connector 283 may be connected to the belt 287 and move together with the belt 287 when the belt 287 moves.

The ingredient channel P may be formed by a tube T passing through the robot connector 270, the arms 210, 220, 230, end effectors 240 and 250 and the end effector 260. The robot connector 270 may be connected to the connector 283.

Figure 10:
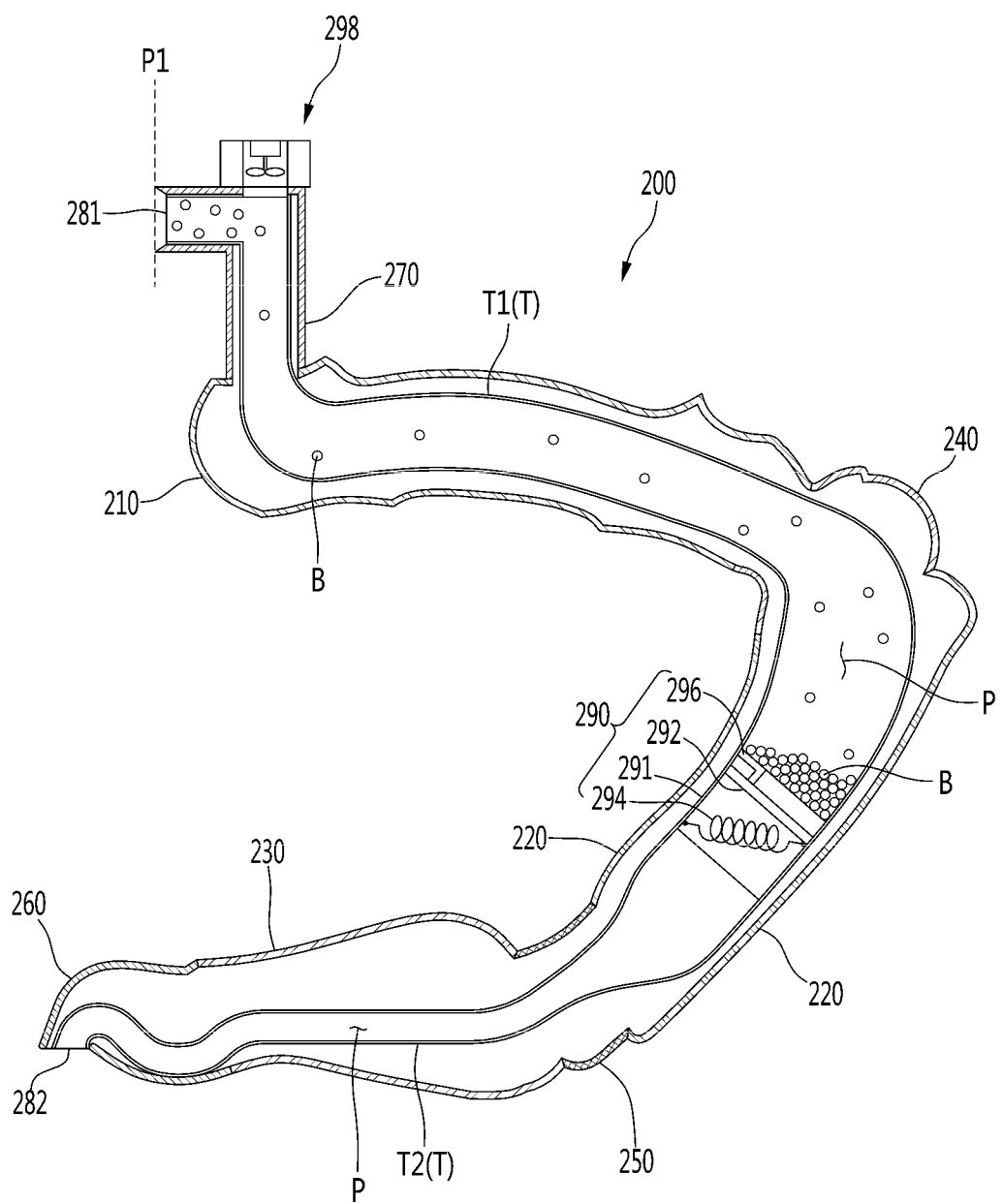
FIG. 10 is a sectional view when a robot arm stores an ingredient according to an embodiment.
Figure 11:
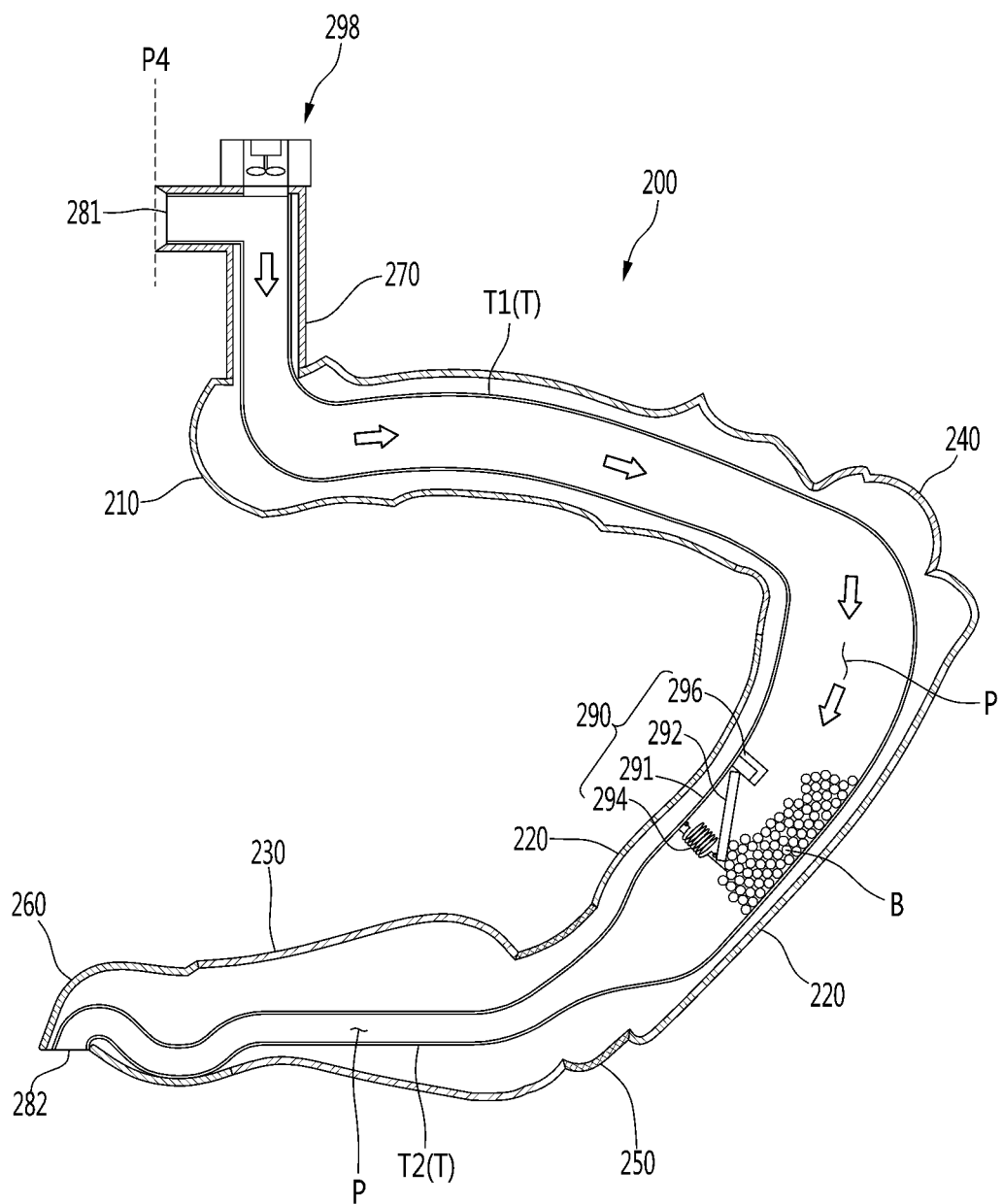
FIG. 11 is a sectional view when a robot arm withdraws an ingredient to an ingredient outlet according to an embodiment.

FIG. 10 is a sectional view when a robot arm stores an ingredient according to an embodiment and FIG. 11 is a sectional view when a robot arm withdraws an ingredient to an ingredient outlet according to an embodiment.

The robot arm 200 may further include a variable stopper 290 for opening or closing the ingredient channel P. The variable stopper 290 may be closer to the ingredient outlet 282 than to the ingredient inlet 281. The variable stopper 290 may be an inner door that allows the ingredient introduced through the ingredient inlet 281 to be temporarily stored in the ingredient channel P.

The variable stopper 290 may open the ingredient channel P after the ingredient outlet 282 is moved over the cooking container F.

The variable stopper 290 may be a valve device provided on the robot arm 200.

The variable stopper 290 may be disposed inside the robot arm 200. The variable stopper 290 may prevent the ingredient from moving to the ingredient outlet 282 when the operation of the blower 298 is stopped. The variable stopper 290 may allow the ingredient to move to the ingredient outlet 282 during the operation of a feeder.

The variable stopper 290 may be a valve device which is opened or closed by the blower 298.

The variable stopper 290 may include a stopper 292 and a spring 294.

The variable stopper 290 may further include a stopper body 291 disposed between the pair of tubes T1 and T2. The robot arm 200 may form the ingredient channel P by the pair of tubes T1 and T2 and the stopper body 291.

The stopper body 291 may have a hollow shape and may allow the ingredient channel formed in any one T1 of the pair of tubes T1 and T2 to communicate with the other one T2 of the pair of tubes T1 and T2.

The stopper 292 may be rotatably disposed on the stopper body 291.

The spring 294 may elastically support the stopper 292 such that the stopper 292 rotates in the direction of blocking the inside of the stopper body 291.

The variable stopper 290 may further include a limiter 296 disposed on the stopper body 291 and latched when the stopper 292 is in a direction of blocking the inside of the stopper body 291. The limiter 296 may be provided to the stopper body 291.

The robot arm 200 may further include a blower 298 for supplying high pressure air to the ingredient channel P. The blower 298 may constitute a part of the robot arm 200 and may move together with the robot arm 200 when the robot arm 200 moves.

The blower 298 may be an ejector that blows air having a preset pressure or above to the stopper 292. The preset pressure may be a pressure that causes the stopper 292 to rotate in the direction of opening the stopper body 291.

After the robot arm 200 is connected to the ingredient feeder 300, the ingredient feeder 300 may feed the ingredient to the ingredient channel P of the robot arm 200, and the ingredient may be temporarily stored between the variable stopper 290 and the ingredient inlet 281.

When the robot arm 200 moves, the robot arm 200 may function as a connector for carrying the ingredient contained in the ingredient channel P.

The robot arm 200 may move from the connection position P1 to the non-connection positions P2, P3 and P4, and the blower 298 may be operated after the robot arm 200 has moved to the non-connection positions P2 and P3. During the operation of the blower 298, the blower 298 may blow high pressure air into the ingredient channel P, and the high pressure air blown from the blower 298 may apply the external force to the stopper 292 to rotate the stopper 292.

The robot may include a controller that controls the carrier 280 and the ingredient feeder 300.

The robot may configure an AI device that performs exercise-related motion operations using an artificial neural network, and may generate various motions by using data stored in the memory 170 and a program of the processor 180 without using the artificial neural network. In the following description, the controller will be denoted with the reference numeral 180 the same as the reference number of the processor.

The controller 180 may control the carrier 280 in a plurality of modes, and the plurality of modes may include a connection mode and a disconnection mode.

The controller 180 may control the ingredient feeder 300 in a plurality of modes, and the plurality of modes may include an ingredient discharge mode.

The controller 180 may control the blower 298 in a plurality of modes, and the plurality of modes may include a blowing mode and a stop mode.

The controller 180 may operate the carrier 280 in the connection mode such that the ingredient inlet 281 is connected with the ingredient port 462.

In the connection mode of the carrier 280, the motor 284 may rotate the pulley 285 in the direction in which the connector 283 is close to the ingredient feeder 300, and the belt 287 may move the connector 283 forward such that the ingredient inlet 81 and the first connector 270 are close to the ingredient port 462 of the ingredient feeder 300 and the second connector 306. As shown in FIG. 7, when the first connector 270 is connected to the second connector 306, the operation of the motor 284 may be stopped.

After the connection mode, the controller 180 may operate the ingredient feeder 300 in the ingredient discharge mode such that the ingredient feeder 300 discharges the ingredient to the ingredient port 462.

In the ingredient discharge mode of the ingredient feeder 300, the control valves 476, 477 and 478 or the feeder 470 of the ingredient feeder 300 may be operated to allow the ingredient to be discharged to the ingredient port 462.

The ingredient processed in the ingredient feeder 300 may come out of the ingredient port 462, and then may be guided along the ingredient channel P after passing through the ingredient inlet 281.

After the ingredient discharge mode, the controller 180 may operate the carrier 280 in the disconnection mode such that the robot arm 200 moves to the position where the ingredient inlet 281 is separated from the ingredient port 462.

In the disconnection mode of the carrier 280, the motor 284 may reversely rotate the pulley 285 such that the ingredient feeder 300 moves away from the connector 283, and the belt 287 may move back the connector 283 such that ingredient inlet 281 and the first connector 270 are moved away from the ingredient port 462 of the ingredient feeder 300 and the second connector 306. As shown in FIG. 8, when the robot arm 200 is moved to a position far from the ingredient feeder 300, the operation of the motor 284 may be stopped.

During the disconnection mode or after disconnection mode is completed, the controller 180 may control the robot arm 200 so that the ingredient outlet 282 of the robot arm 200 faces the inside of the ingredient container F and may control the blower 298 in the blowing mode so that the ingredient contained in the ingredient channel P of robot arm 200 may be discharged through the ingredient outlet 282.

In the blowing mode of the blower 298, high pressure air may be blown into the ingredient channel P from the blower 298, and the high pressure air may exert an external force on the variable stopper to open the variable stopper 290.

That is, the robot may sequentially perform the processes of connecting the robot arm 200 and the ingredient feeder 300, discharging the ingredient by the ingredient feeder 200, separating the robot arm 200 and the ingredient feeder 300, and transferring the ingredient in the robot arm 200 to the ingredient container. In addition, the robot may move to the ingredient feeder 300 to receive the ingredient from the ingredient feeder 300 to temporarily store the ingredient and may move to the periphery of the cooking container F located at a long distance to feed the ingredient to the cooking container F.

Figure 12:
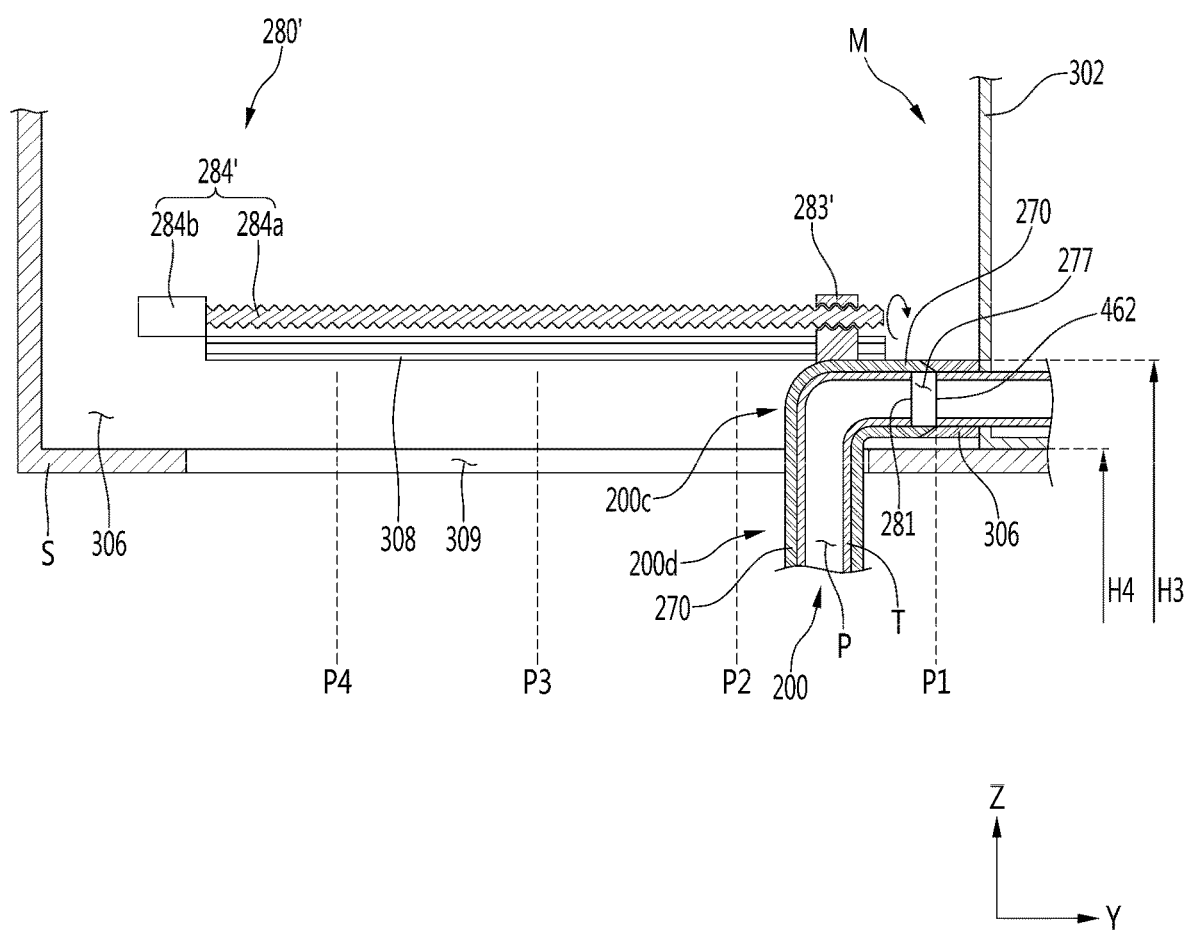
FIG. 12 is a sectional view showing a robot arm connected to an ingredient feeder by another example of a carrier according to an embodiment.
Figure 13:
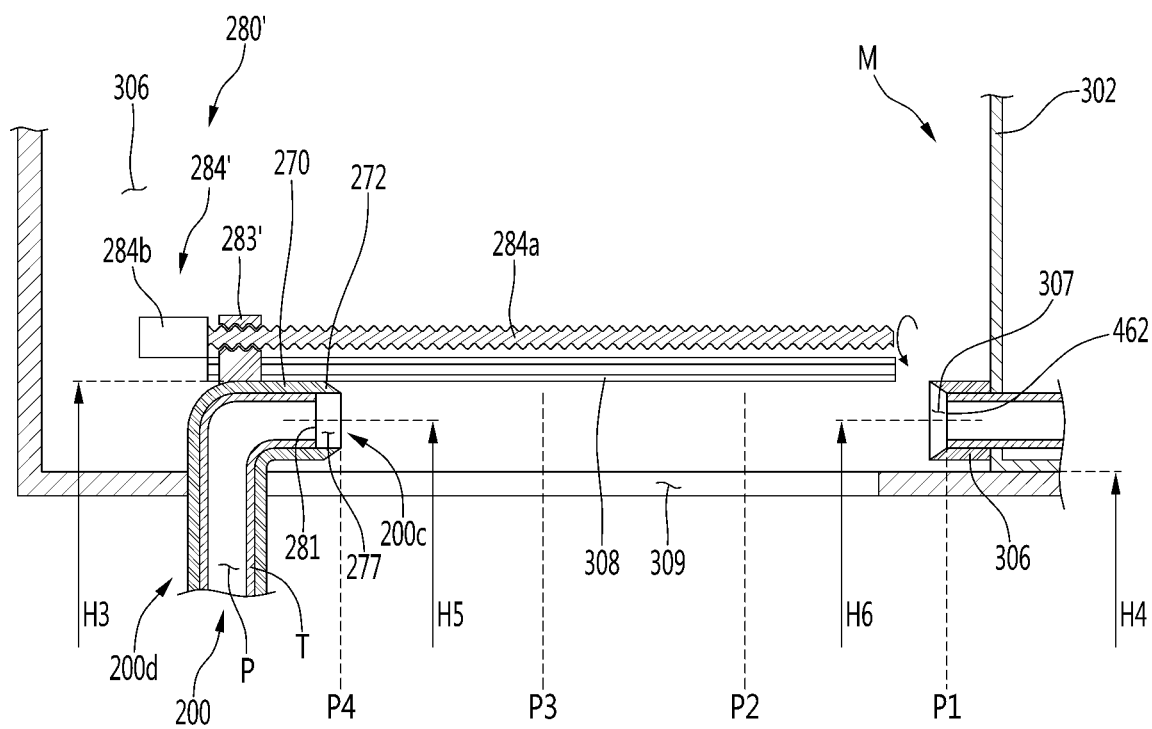
FIG. 13 is a sectional view showing a robot arm separated from an ingredient feeder by another example of a carrier according to an embodiment.
Figure 13:
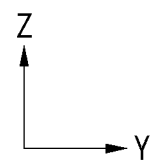

FIG. 12 is a sectional view showing a robot arm connected to an ingredient feeder by another example of a carrier according to an embodiment and FIG. 13 is a sectional view showing a robot arm separated from an ingredient feeder by another example of a carrier according to an embodiment.

The carrier 280' shown in FIGS. 12 and 13 may include a connector 283' to which the robot arm 200 is connected; and a screw motor 284' to linearly move the connector 283'.

The screw motor 284' may include a screw 284a formed at an outer peripheral surface thereof with a spiral groove, and a motor 284b connected to the screw 284a to rotate the screw 284a.

The screw 284a may have a long rod shape extending in the horizontal direction. When the screw 284a rotates, the connector 283' may move in the longitudinal direction of the screw 284a so that the connector 283' may linearly move.

The connector 283' may be formed with a through hole through which the screw 284a passes, and a spiral protrusion may be formed at the inner circumference of the connector 283' to engage with the outer circumference of the screw 284a.

The carrier of the present embodiment is not limited so long as it can move the robot arm 200.

According to an embodiment, after the robot arm is connected to the ingredient feeder to receive the ingredient from the ingredient feeder, the robot arm moves to the cooking area to input the ingredient into the cooking container located in the cooking area, and the robot arm can safely feed the ingredient into the cooking container even when the cooking area in which the cooking container is placed is located far from the ingredient feeder.

In addition, the movable distance of the robot arm can be increased, so that the cooking operation by the robot arm can be more diversified, and the entire cooking area in which the robot arm can cook can be maximized.

The foregoing description is merely illustrative of the technical idea of the present invention and various changes and modifications may be made by those skilled in the art without departing from the essential characteristics of the present invention.

Therefore, the embodiments disclosed in the present disclosure are intended to illustrate rather than limit the technical idea of the present invention, and the scope of the technical idea of the present invention is not limited by these embodiments.

The scope of protection of the present invention should be construed according to the following claims, and all technical ideas falling within the equivalent scope to the scope of protection should be construed as falling within the scope of the present invention.

What is claimed is:

1. A robot comprising:
   a robot arm formed with an ingredient channel including an ingredient inlet and an ingredient outlet;
   an ingredient feeder having an ingredient port configured to discharge ingredients; and
   a carrier configured to move the robot arm to a connection position where the ingredient inlet is connected to the ingredient port, and move the robot arm to an area where the ingredient inlet is separated from the ingredient port.

2. The robot according to claim 1, wherein a first connector is provided on one of the robot arm or the ingredient feeder, and
   a second connector is provided on the other of the robot arm or the ingredient feeder such that the first connector is connected to or disconnected from the second connector.

3. The robot according to claim 2, wherein one of the first connector or the second connector includes an insertion portion inserted into the other of the first connector or the second connector.

4. The robot according to claim 2, wherein a connector channel through which ingredients pass is formed in at least one of the first connector or the second connector,
   the ingredient port and ingredient inlet face the connector channel, and
   the ingredients sequentially pass through the ingredient port, the connector channel and the ingredient inlet.

5. The robot according to claim 2, wherein the ingredient channel is formed by a tube,
   the ingredient port is formed by a feed tube formed therein with a passage through which ingredients pass,
   the first connector surrounds a portion of the tube, and
   the second connector surrounds a portion of the feed tube.

6. The robot according to claim 1, wherein the ingredient inlet and the ingredient port have same heights.

7. The robot according to claim 1, wherein the ingredient inlet and the ingredient port are spaced apart from each other in a horizontal direction, and
   the carrier moves the robot arm in the horizontal direction.

8. The robot according to claim 1, wherein a height of an upper end of the robot arm is higher than a height of a lower end of the ingredient feeder.

9. The robot according to claim 1, wherein the carrier includes:
   a connector to which the robot arm is connected;
   a motor; and
   at least one power transmission member configured to transmit driving force of the motor to the connector to linearly move the connector.

10. The robot according to claim 9, wherein the power transmission member includes:
    a pair of pulleys; and
    a belt wound around the pair of pulleys, and
    wherein the motor rotates at least one of the pair of pulleys, and
    the connector is connected to the belt.

11. The robot according to claim 1, wherein the carrier includes:
    a connector to which the robot arm is connected; and
    a screw motor configured to linearly move the connector.

12. The robot according to claim 10, wherein the robot arm includes:
    a plurality of arms;
    an arm connector connecting a pair of arms adjacent to each other;
    an end effect connected to one of the plurality of arms; and
    a connector connector connected to the connector, and
    wherein the ingredient channel is formed by a tube passing through the connector connector, the arm, the end effector.

13. The robot according to claim 12, further comprising a controller which is configured to:
    operate the carrier in a connection mode such that the ingredient inlet is connected to the ingredient port;
    operate the ingredient feeder in an ingredient discharge mode after the connection mode such that the ingredient feeder discharges ingredients to the ingredient port; and
    operate the carrier in a separation mode after the ingredient discharge mode such that the robot arm is moved to a position where the ingredient inlet is separated from the ingredient port.

14. The robot according to claim 1, wherein the robot arm further includes a variable stopper configured to open or close the ingredient channel.

15. The robot according to claim 14, wherein the variable stopper is closer to the ingredient outlet than to the ingredient inlet.

16. The robot according to claim 1, further comprising a case formed with a space, wherein the ingredient feeder and the carrier are accommodated in the space.

17. The robot according to claim 16, wherein the case is provided with a guide rail which is configured to guide the robot arm such that the robot arm moves back and forth with respect to the ingredient feeder.

18. The robot according to claim 16, wherein the case has a robot arm through hole which is elongated in a movement direction of the robot arm such that the robot arm passes through the robot arm through hole, and
    wherein the robot arm includes:
    a concealment portion accommodated in the space and including the ingredient inlet, in which concealment portion is connected to or separated from the ingredient feeder; and
    an exposure portion located outside the case and including the ingredient outlet.

19. The robot according to claim 1, wherein the robot arm further includes a blower configured to supply high pressure air to the ingredient channel.

20. The robot according to claim 19, further comprising:
    a controller configured to operate the blower in a blowing mode after controlling the robot arm such that the ingredient outlet of the robot arm faces an ingredient container.

* * * * *